(12) United States Patent
Whiting et al.

(10) Patent No.: US 11,468,538 B2
(45) Date of Patent: Oct. 11, 2022

(54) SEGMENTATION AND PREDICTION OF LOW-LEVEL TEMPORAL PLUME PATTERNS

(71) Applicant: Baker Hughes Oilfield Operations LLC, Houston, TX (US)

(72) Inventors: Ozge Can Whiting, Providence, RI (US); Rajeev Bhatt, Planisboro, NJ (US); Mustafa Gokhan Uzunbas, Cambridge, MA (US); Thai Hoang, Houston, TX (US); Vladimir Shapiro, Newton, MA (US); John Passarelli, Boston, MA (US); Weiwei Qian, Lexington, MA (US); John Hare, Highland, NY (US); Taufiq Dhanani, Boston, MA (US); Matthias Odisio, Dallas, TX (US); Edvardas Kairiukstis, Boston, MA (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 177 days.

(21) Appl. No.: 16/839,591

(22) Filed: Apr. 3, 2020

(65) Prior Publication Data
US 2020/0320659 A1 Oct. 8, 2020

Related U.S. Application Data

(60) Provisional application No. 62/829,826, filed on Apr. 5, 2019.

(51) Int. Cl.
*G06K 9/00* (2022.01)
*G06T 1/00* (2006.01)
(Continued)

(52) U.S. Cl.
CPC ............ *G06T 1/0014* (2013.01); *B25J 19/023* (2013.01); *G06T 7/12* (2017.01); *G06T 2207/10048* (2013.01)

(58) Field of Classification Search
None
See application file for complete search history.

(56) References Cited

U.S. PATENT DOCUMENTS

| 9,726,543 B2 | 8/2017 | Zeng |
| 10,267,686 B2 | 4/2019 | Kester et al. |

(Continued)

FOREIGN PATENT DOCUMENTS

WO 2018-231735 12/2018

OTHER PUBLICATIONS

Frizzi et al. 'Convolutional neural network for video fire and smoke detection.' In: IECON 2016—42nd Annual Conference of the IEEE Industrial Electronics Society. IEEE, Oct. 26, 2016, pp. 877-882. pp. 877-881 and figures 11.1, 11.2.

(Continued)

*Primary Examiner* — Wei Wen Yang
(74) *Attorney, Agent, or Firm* — Mintz Levin Cohn Ferris Glovsky and Popeo, PC; Lisa Adams

(57) ABSTRACT

Computer vision based systems, and methods are provided for generating plume analysis data from a plurality of input image frames as captured by a camera. Image data associated with a plume of gas is received and provided as inputs to a predictive model used to determine plume analysis data including a plume prediction segmentation mask associated with the plume of gas. Other attributes of the plume are also estimated from the prediction segmentation mask such as cross-sectional area, cross-sectional velocity, leak source pixel and volumetric leak rates. The plume analysis data can be provided as an overlay atop the image data. The plume (Continued)

analysis data overlaid atop the image data can be transmitted by and/or to one or more computing devices.

18 Claims, 15 Drawing Sheets

(51) Int. Cl.
  *G06T 7/12* (2017.01)
  *B25J 19/02* (2006.01)

(56) References Cited

U.S. PATENT DOCUMENTS

| | | | |
|---|---|---|---|
| 10,458,905 B2 | 10/2019 | Kester et al. | |
| 10,527,412 B2 | 1/2020 | Thorpe et al. | |
| 2014/0002639 A1* | 1/2014 | Cheben | G08B 21/14 348/135 |
| 2019/0376890 A1* | 12/2019 | Bennett | G06T 7/73 |

OTHER PUBLICATIONS

Infrared Camera for Methane and VOC Detection, FLIR GF320, https://www.flir.com/products/gf320/.
Abdel-Moati H., et al., "New Optical Gas Imaging Technology for Quantifying Fugitive Emission Rates", Proc. of International Petroleum Technology Conference, 2015.
Badrinarayanan V., et al., "Segnet: A deep convolutional encoder-decoder architecture for image segmentation", IEEE transactions on pattern analysis and machine intelligence (PAMI), vol. 39, 2017, pp. 2481-2495.
Bhatt Rajeev, et al., "Segmentation of Low-Level Temporal Plume Patterns From IR Video", The IEEE Conference on Computer Vision and Pattern Recognition (CVPR) Workshops, 2019.
Celik T., "Fast and Efficient Method for Fire Detection Using Image Processing", ETRI Journal, vol. 32, No. 6, Dec. 2010.
Donahue J., et al., "Long-term recurrent convolutional networks for visual recognition and description", In Proceedings of the IEEE Conference on Computer Vision and Pattern Recognition, 2015.
Donahue J., et al., "Long-term recurrent convolutional networks for visual recognition and description", In Proceedings of the IEEE Conference on Computer Vision and Pattern Recognition, 2015, pp. 2625-2634.
Gerhart T., et al., "Detection and tracking of gas plumes in LWIR hyperspectral video sequence data", In SPIE Conference on Defense Security and Sensing, 2013.
Habiboglu Y., et al., "Flame detection method in video using covariance descriptors", IEEE International Conference on Speech and Signal Processing, 2011, pp. 1817-1820.
Jain Ashesh, et al., "Structural-RNN: Deep learning on spatio-temporal graphs", In Proc. of the IEEE Conference on Computer Vision and Pattern Recognition, 2016, pp. 5308-5317.
Jiang Zhuolin, et al., "Learning Spatiotemporal Features for Infrared Action Recognition with 3D Convolutional Neural Networks", Proc. of IEEE Conf. on Computer Vision and Pattern Recognition (CVPR)., 2017.
Li Y., et al., "Diffusion convolutional recurrent neural network: Datadriven traffic forecasting", In Proc. Int. Learning Representations (ICLR '18), Jul. 2017.
Lin T.-Y., et al., "Feature pyramid networks for object detection", Proc. of IEEE Conf on Computer Vision and Pattern Recognition (CVPR)., 2017.

Noh H., et al., "Learning deconvolution network for semantic segmentation", Proc. of IEEE international conference on computer vision (ICCV), 2015, pp. 1520-1528.
Peris A., et al., "Video description using bidirectional recurrent neural networks", arXiv preprint arXiv:1604.03390, 2016.
Razmi S., et al., "Vision-Based Flame Detection: Motion Detection & Fire Analysis", IEEE Student Conference on Research and Development, 2010, pp. 187-191.
Ronneberger Olaf, et al., "U-Net: Convolutional Networks for Biomedical Image Segmentation", Proc. of Medical Image Computing and Computer Assisted Intervention (MICCAI). vol. 9351, 2015, pp. 234-241.
Ronneberger O., et al., "U-net: Convolutional networks for biomedical image segmentation", In Proc. Med. Image Comput. Comput.-Assisted Intervention, 2015, pp. 234-241.
Shi Xingjian, et al., "Convolutional LSTM Network: A Machine Learning Approach for Precipitation Nowcasting", 205. Proceedings of the 28th International Conference on Neural Information Processing Systems, vol. 1, pp. 802-810.
Simonyan K., et al., "Very deep convolutional networks for large-scale image recognition", In ICLR, 2015.
Tochon Guillaume, et al., "Gas Plume Detection and Tracking in Hyperspectral Video Sequences using Binary Partition Trees", In IEEE Workshop on Hyperspectral Image and Signal Processing: Evolution in Remote Sensing (Whispers 2014), Lausanne, Switzerland, 2014.
Toreyin B., et al., "Contour based smoke detection in video using wavelets", European Signal Processing Conference (EUSIPCO), 2006.
Toreyin B., et al., "Online Detection of Fire in Video", IEEE Conference on Computer Vision and Pattern Recognition, 2007, pp. 1-7.
Tran Du, et al., "Learning Spatiotemporal Features With 3D Convolutional Networks", Proc. of The IEEE International Conference on Computer Vision (ICCV), 2015.
Vinicius P., et al., "A Probabilistic Approach for Vision-Based Fire Detection in Videos", IEEE Transactions on Circuits and Systems for video technology, vol. 20, No. 5,, 2010, pp. 721-731.
Vinyals O., et al., "Show and tell: A neural image caption generator", In Proceedings of the IEEE Conference on Computer Vision and Pattern Recognition, 2015, pp. 3156-3164.
Wu Z., et al., "Modeling spatial-temporal clues in a hybrid deep learning framework for video classification", In Proceedings of the 23rd ACM international conference on Multimedia, 2015, pp. 461-470.
Wu T., et al., "Short-Term Traffic Flow Forecasting with Spatial-Temporal Correlation in a Hybrid Deep Learning Framework", Computer Vision and Pattern Recognition (cs.CV), arXiv:1612.01022, Cornell University, 2016.
Yang Xiao-Jiao Mao, et al., "Image Restoration Using Convolutional Auto-encoders with Symmetric Skip Connections", Proc. of Advances in Neural Information Processing Systems, 2016, pp. 2802-2810.
Yao L., et al., "Describing videos by exploiting temporal structure", In Proceedings of the IEEE International Conference on Computer Vision, 2015, pp. 4507-4515.
Yu Bing, et al., "Spatio-temporal graph convolutional neural network: A deep learning framework for traffic forecasting", arXiv preprint arXiv:1709.04875, 2017a.
Yu Bing, et al., "ST-UNet: A Spatio-Temporal U-Network for Graph-structured Time Series Modeling", arXiv preprint arXiv:1903.05631, 2019.
Zhang J., et al., "Deep Spatio-Temporal Residual Networks for Citywide Crowd Flows Prediction", Proc. of the Thirty-First AAAI Conference on Artificial Intelligence, 2017.

\* cited by examiner

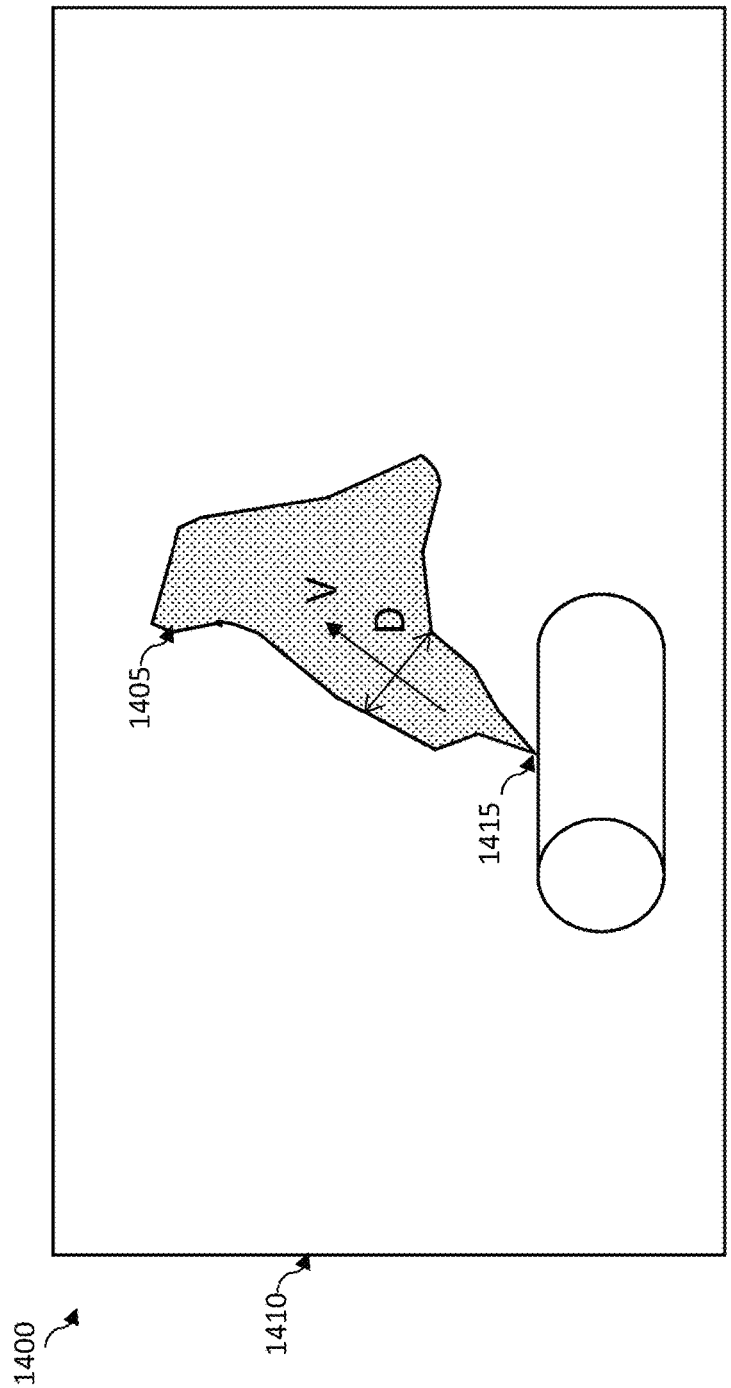

D: diameter of a cross-section of plume mask in units pixels
R: radius of a cross-section of plume mask where R = D/2
A: cross-sectional area of the plume in units pixel square where $A = \pi * R^2$ assuming a circular profile in 3D on the cross-sectional plane.
V: speed of particles passing through cross-section in units pixels per second
 note that in figure V is shown as a velocity vector with speed as its magnitude and a direction
Q: volumetric leak rate of the plume in units pixel cube per second where $Q = A*V$

Figure 14

SEGMENTATION AND PREDICTION OF LOW-LEVEL TEMPORAL PLUME PATTERNS

RELATED APPLICATION

This application claims priority under 35 U.S.C. § 119(e) to U.S. Provisional Application No. 62/829,826, filed Apr. 5, 2019, the entire contents of which are hereby expressly incorporated by reference herein.

BACKGROUND

Thermal monitoring and inspection of industrial assets, such as assets configured in oil and gas production environments, can be performed to ensure operational safety of the assets and to determine the presence of gas leaks. Gas leaks in these environments can create hazardous operating conditions for personnel assigned to operate, maintain, and repair the industrial assets and can reduce production rates. Thermal imaging using modalities such as long wave infrared (LWIR) and medium wave infrared (MWIR) can be performed to monitor and inspect the industrial assets for the presence of gas leaks. The gas leaks form plumes of gas which can be detected using thermal imaging.

Deep learning is an application of artificial intelligence and machine learning that automates the development of an analytical model based on an artificial neural network that iteratively learns patterns from data using a hierarchical cascade of multiple layers of non-linear processing units to extract and transform features of the data. The analytical model can be trained to learn in a supervised manner and can be trained to learn multiple levels of representations within the data that correspond to different levels of abstraction and form a hierarchy of concepts. Deep learning is commonly used in pattern recognition, computer vision, language processing and optical character recognition and enables the construction of algorithms that can accurately learn from data to predict model outputs thereby making data-driven predictions or decisions. Deep learning can be utilized to develop predictive models capable of determining and generating plume analysis from imaging data associated with a plume of gas emitted from an industrial asset.

SUMMARY

In one aspect, methods for detecting and quantifying a gas plume from image data are provided. In one embodiment, the method can include receiving image data associated with a plume of gas. The image data including a plurality of image frames. The method can also include determining plume analysis data using the received image data and a first predictive model trained to receive image data and, in response to the receiving, generate plume analysis data associated with the plume of gas. The plume analysis data includes a plume predicted segmentation mask associated with the plume of gas and predicted in relation to a sequence of image frames included in the image data. The method can further include determining, for the plume of gas at least one of a leak size estimation, a leak source estimation, and a volumetric leak rate estimation. The method can also include providing the leak size estimation, the leak source estimation, the volumetric leak rate estimation, and the plume analysis data. The plume analysis data can be provided as an overlay atop the image data. The method can also include transmitting the plume analysis data overlaid atop the image data. The method can also include performing at least one of the receiving, the determining, the providing, and the transmitting by at least one data processor forming part of at least one computing system.

Non-transitory computer program products (i.e., physically embodied computer program products) are also described that store instructions, which when executed by one or more data processors of one or more computing systems, causes at least one data processor to perform operations herein to detect and quantify a gas plume from image data. Similarly, computer systems are also described that may include one or more data processors and memory coupled to the one or more data processors. The memory may temporarily or permanently store instructions that cause at least one processor to perform one or more of the operations described herein to detect and quantify a gas plume from image data. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

DESCRIPTION OF DRAWINGS

These and other features will be more readily understood from the following detailed description taken in conjunction with the accompanying drawings described below.

FIG. 14 is a diagram of a plume prediction segmentation mask which delineates the extent of the plume in one frame of a sequence of image frames included in received image data according to an exemplary embodiment described herein.

Figure 1:
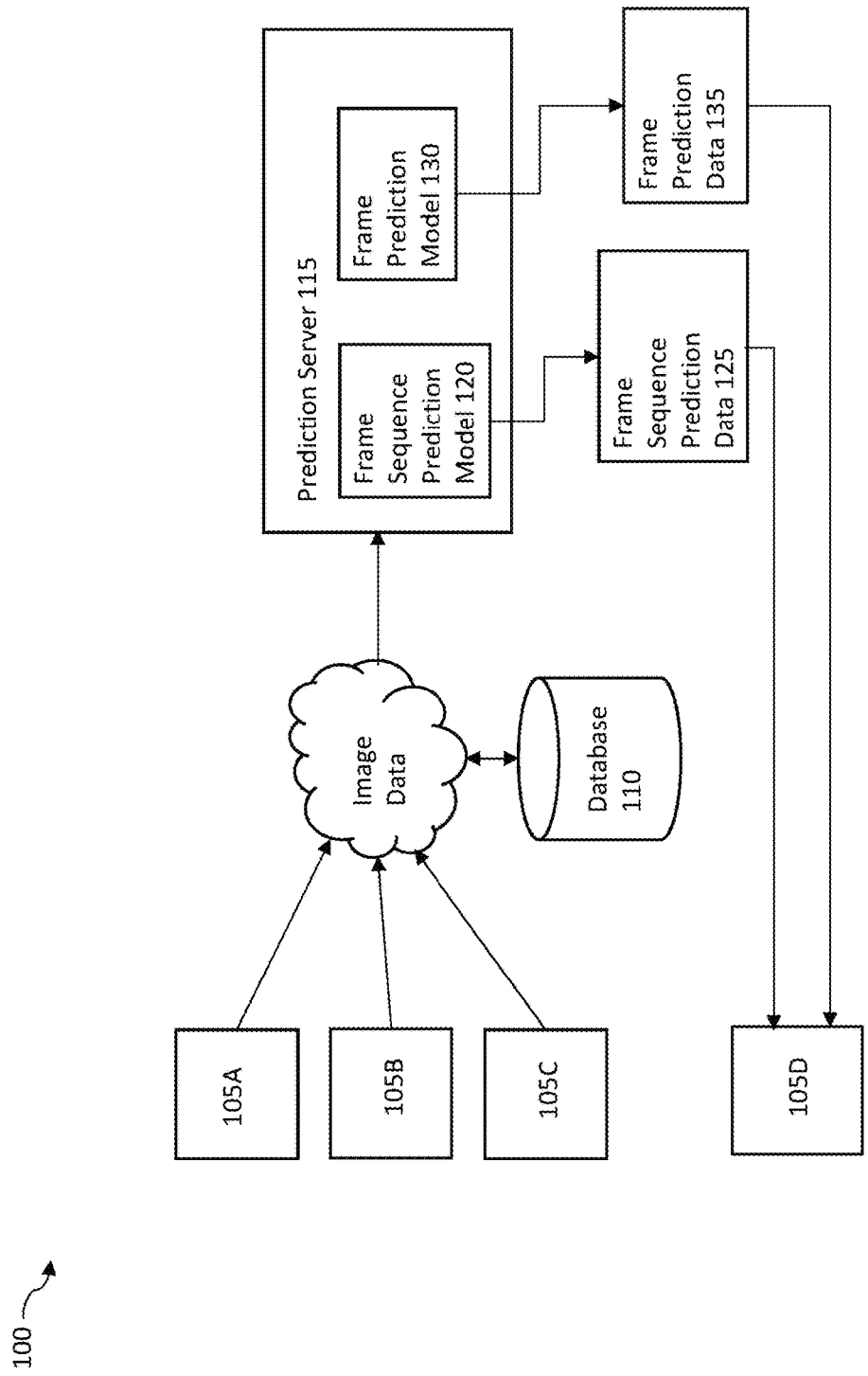
FIG. 1 is a block diagram illustrating an example architecture for generating plume analysis data using image data and a predictive model.

It is noted that the drawings are not necessarily to scale. The drawings are intended to depict only typical aspects of the subject matter disclosed herein, and therefore should not be considered as limiting the scope of the disclosure.

DETAILED DESCRIPTION

Oil and gas production environments include networks of pipelines coupling industrial assets, such as motors, compressors, and accumulation tanks, used to store, process, and distribute energy products in a gaseous format throughout the production environment. Operators of these environments perform monitoring and inspection of the pipelines and industrial assets using thermal imaging in order to detect leaks which may cause unsafe operating conditions, reduce the air quality or reduce operating production rates. Thermal imaging can be performed using infrared cameras capable of capturing images in the long wave infrared (LWIR) and medium wave infrared (MWIR) spectrum. Infrared (IR) cameras can be preferred over cameras operating in the visible light spectrum, such as cameras configured to acquire images based on red-green-blue (RGB) color models, because IR cameras are more robust in regard to illumination changes, shadows, and has advantages when observed phenomena include a distinct thermal signature and/or requires 24-hour, continuous monitoring.

Gas leaks occurring in an oil and gas production environment can form plumes of gaseous vapors that can present a distinguishable pattern with good thermal contrast to background objects depending on the rate of the leak. While plume detection can be performed by IR and even visible-light cameras for some forms of gas, such as steam, human operators have been required to manually perform analysis of the acquired image data to identify and confirm the presence of a leak, estimate the quantity of gas that is leaking, and determine the spatial and temporal dynamics of the plume of gas in the acquired image data. Image segmentation is a process of partitioning a digital image into multiple segments in order to delineate boundaries and shapes of unique features which are present within the images, such as plumes of gas. Observing each image stream to identify sequences with a plume, estimating the quantity and sometimes manually segmenting out the plumes of gas in the image data is a detail-oriented, error-prone and labor intensive task requiring uniquely skilled personnel which can increase the cost of monitoring and inspection operations and further increase production costs associated with the oil and gas production environment. Successfully performing plume identification, quantification and manual segmentation operations of plume image data can also be limited to the experience of the operator performing the segmentation, as well as the degree of foreground and background features which may obscure or otherwise reduce the operators' ability to accurately determine the shape and movement of the plume of gas resulting and is thus prone to human error. For example, manual identification of gas plumes can be challenging in an environment in which humans and/or vehicles can occlude observation of gas plume being imaged, or when the leak rate is small and thus the plume contrast in the image data is faint. Manual identification of gas plumes can also be difficult when there are other forms of spatio-temporal motion such as background thermal fluctuations due to vegetation, wind, solar or cloud reflections, and the like.

An improved plume prediction system can be configured to receive image data from an IR or visible-light camera and to automatically determine spatial and temporal characteristics of deforming blobs of gas plumes present in the image data. The spatial and temporal characteristics can be output as highly-accurate segmentation masks which can be applied to the acquired image data on a frame-by-frame basis. The improved plume prediction system can thus automate the otherwise manually intensive plume identification, quantification and/or segmentation tasks and can be trained to detect new plume characteristics based on previously collected image data. Such an improved plume prediction system can provide oil and gas production operators with greater insight into the current operating conditions of the industrial assets configured in the oil and gas production environment and can also aid forecasting future maintenance and repair operations based on early detection of leaks, as well as helping with carbon footprint management and reduction. The improved plume prediction system can generate plume analysis data automatically to assist operators in planning configurations of industrial assets and deployment of monitoring, inspection and repair personnel or equipment, while maintaining production at acceptable and profitable levels.

Thus, systems and methods to automatically determine and generate plume analysis data based on acquired image data may significantly increase the operational performance and longevity of industrial assets deployed in an oil and gas production environment as well as being used to reduce the carbon footprint of the facility. In addition, an improved plume prediction system can reduce the number of skilled resources required to detect and characterize image data in order to determine the presence of leaks or determine leak rates. For example, image data received from fixed or camera mounted on mobile platforms observing a portion of a pipeline, a valve, or a compressor can be received and processed by the improved plume prediction system and the results can be provided in a graphical user interface (GUI) or an inspection report configured to display the plume analysis data, such as plume prediction segmentation as overlays atop one or more frames of image data acquired by the camera observing the particular asset. Without an improved system as will be described further herein, substantial human personnel and computing resources would be required to collect image data from target assets being observed for leak detection and to process the image data to manually determine the spatial and temporal characteristics of the plumes of gas suspected as leaks.

A plume prediction system is provided herein including systems, methods, and computer-readable mediums for determining and generating plume analysis data for industrial assets based on image data collected from a camera observing the assets. The plume analysis data is generated by a predictive model that has been trained in a deep learning process in an offline manner using previously collected data which is acquired under similar conditions and by a similar sensor and under similar imaging geometries. This training data is manually annotated in an offline manner by humans to create ground-truth masks of plumes. During prediction phase, image data which may or may not be observing an actual plume of gas is received and plume analysis data is generated, including plume prediction segmentation mask data if a plume indeed exists in the data, which can be used to provide the plume analysis data as an overlay atop the acquired image data. The plume prediction system can also include a GUI to present the plume analysis data associated with a plume or leak of gas originating from an industrial asset in a display that can be configured based on user preferences. The GUI can be configured to allow users to interact with the plume analysis data, for example by filtering, sorting, geo-tagging, or applying leak rate detection and analysis functionality to the data. The GUI can also be configured to execute functionality related to triggering alarms and/or maintenance and repair procedures for the detected leak based on the users' interaction with the GUI.

Embodiments of systems and corresponding methods for generating plume analysis data based on image data associated with a plume of gas emanating from an industrial asset are discussed herein. However, embodiments of the disclosure can be employed for generating plume analysis data based on image data associated with other types of machinery or sources of gas without limit.

FIG. 1 is a block diagram illustrating an example architecture 100 for generating plume analysis data for a plume of gas emanating from an industrial asset using image data and a predictive model. The architecture 100 includes clients 105, database 110, and prediction server 115, which can be communicatively coupled over a network. In some embodiments, clients 105 can transmit image data directly to the prediction server 115 without utilizing a network.

As shown in FIG. 1, the architecture 100 includes clients 105, e.g., clients 105A-105D. The clients 105 can be configured to acquire, generate, and/or store image data, such as clients 105A-105C. For example, the image data can be transmitted from an IR camera 105, such as a LWIR or a MWIR camera that is configured to observe a plume of gas. In some embodiments, the client 105 can include a visible-light camera configured to acquire images in the visible light spectrum using an RGB color model. In some embodiments, the client 105 can include one or more computing devices configured to store image data that has been previously downloaded from an IR or visible-light camera configured to observe a plume of gas. In some embodiments, the client 105 can transmit the image data as streaming data, such as streaming video data, that is collected and transmitted in real-time or near real-time.

The clients 105 can include a large-format computing device or any other fully functional computing device, such as a desktop computer or laptop computer, can transmit image data to prediction server 115. Additionally, or alternatively, other computing devices, such as a small-format computing devices 105 can also transmit image data to the prediction server 115. Small-format computing devices 105 can include a tablet, smartphone, personal digital assistant (PDA), or any other computing device that can have more limited functionality compared to large-format computing devices. For example, client 105A can include a laptop configured with a web-browser to provide a sensor management application configured to collect image data from a number of fixed or mobile cameras deployed throughout an oil and gas production environment. Client 105B can include an IR camera configured to observe a gas compressor and to transmit image data associated with a scene where the compressor is present. Client 105C can include a historical image data collection stored in memory that can be used to provide image data from past leaks as training data. Additionally, client 105D can include a computing device configured to display plume analysis data associated with the image data received from clients 105A-105C.

The architecture 100 also includes a database 110 that can store image data received from the clients 105 or from other computing devices or cameras via a network. In some embodiments, the database 110 can store historical image data associated with past suspected or confirmed leaks exhibited by one or more industrial assets as well as plume data collected through controlled gas emissions with known leak rates in suitable testing environments. The database 110 can also store image data that can be used as training data in a machine learning process to train one or more predictive models. In some embodiments, the database 110 can also store image data that can be used as prediction data can be received by the prediction server 115 to determine and generate the plume analysis data, for example as frame sequence prediction data 125 and/or the frame prediction data 135. The database 110 can further store the plume analysis data generated by the prediction server 115.

As further shown in FIG. 1, image data can be transmitted from the clients 105 and/or from the database 110 to the prediction server 115. In some embodiments, the image data, provided as prediction data, can be provided to the prediction server 115 as inputs to one or more predictive models developed using supervised deep learning methods. The image data can include frames of image data, including sequential and non-sequential frames of image data that may be received from a particular camera and/or multiple cameras that can be configured to acquire frames of images in the IR or visible-light spectrum as well as any associated metadata of the images such as camera name, GPS position of the frame, etc.

As shown in FIG. 1, the architecture 100 includes a prediction server 115 configured to receive the image data and generate plume analysis data, such as the frame sequence prediction data 125 predicted for a sequence of image frames and the frame prediction data 135 predicted for individual image frames. The prediction server 115 includes a trained frame sequence prediction model 120. The frame sequence prediction model 120 can include a network or algorithm that has been generated as a result of the model training performed during the training aspect of the deep learning process. Once trained, the frame sequence prediction model 120 can operate outside of a deep learning process to receive image data as prediction data and to generate plume analysis data for sequences of image frames associated with a plume of gas. For example, the frame sequence prediction model 120 generates plume analysis data as frame sequence prediction data 125 based on processing multiple sequential image frames, organized as a sequence of image frames. The frame sequence prediction data 125 can include plume prediction masks generated for a sequence of image frames. In some embodiments, the frame sequence prediction model 120 can be deployed on the prediction server 115 or can be deployed in a configuration that is remotely located from, yet communicatively coupled to, the prediction server 115. For example, the frame sequence prediction model 120 can be located in a remote, cloud computing environment that is coupled to the clients 105 via a network.

Figure 2A:
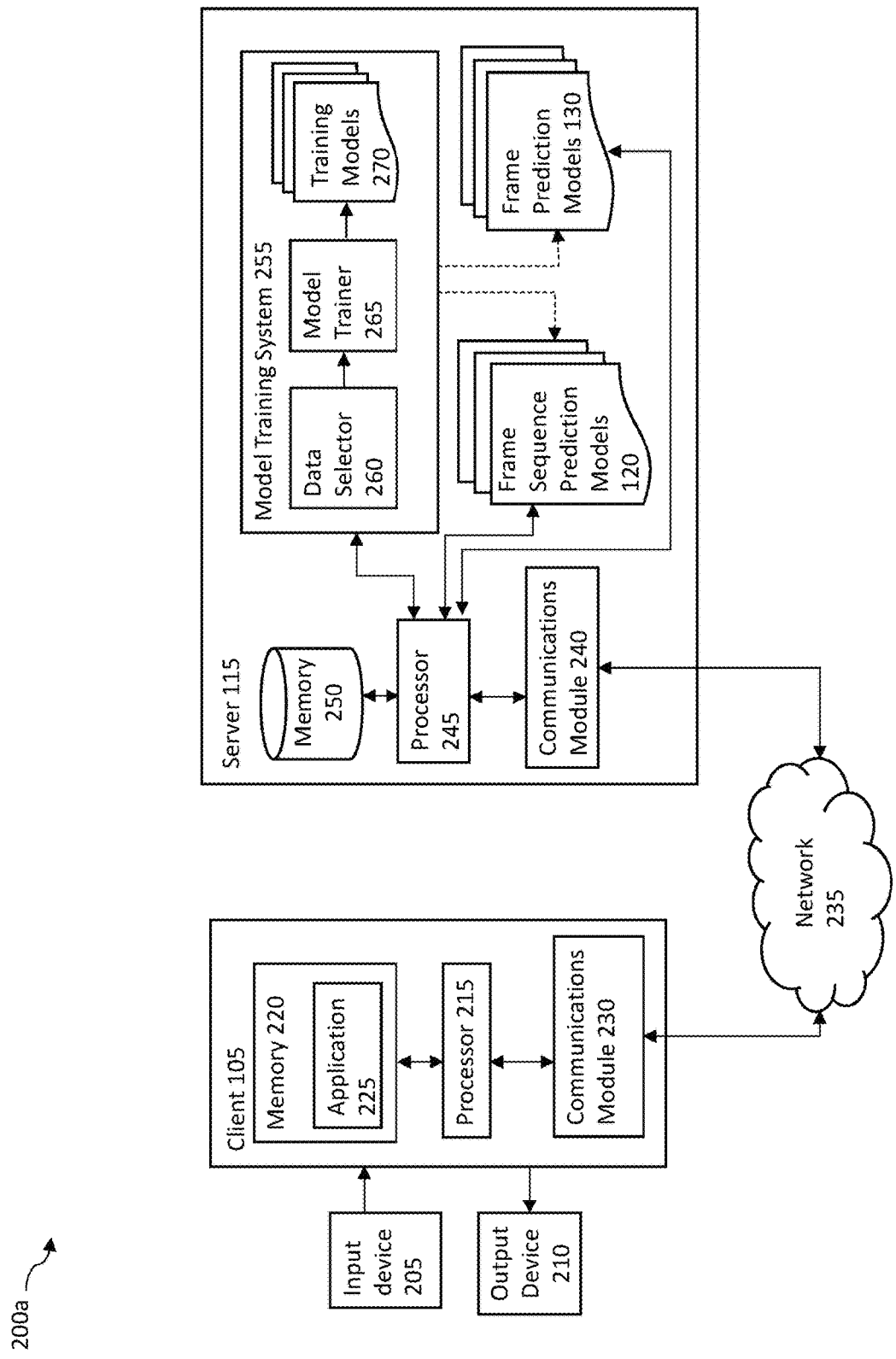
FIGS. 2A-2B illustrate example block diagrams of systems for generating plume analysis data using image data and a predictive model.

FIG. 2A is an example block diagram of a system 200a for generating plume analysis data based on image data using deep learning according to some embodiments. System 200*a* includes an input device 205 and an output device 210 coupled to a client 105, such as any of the clients 105 described in relation to FIG. 1.

As shown in FIG. 2A, the client 105 includes a processor 215 and a memory 220 storing an application 225. The client 105 also includes a communications module 230 connected to network 235. System 200*a* also includes a server 115, such as the prediction server 115 described in relation to FIG. 1. The server 115 includes a communications module 240, a processor 245 and a memory 250. The server 115 also includes a model training system 255. The model training system 255 includes a data selector 260, a model trainer 265 and one or more training models 270. The server 115 also includes one or more trained frame sequence prediction models 120 trained via a supervised deep learning process and one or more trained frame prediction models 130 which have also been trained via a supervised deep learning process. The frame sequence prediction models 120 and the frame prediction models 130 are shown in dotted lines to indicate that the training models 270, which were output during the training performed in one of the deep learning processes can be one or more trained prediction models, such as the one or more frame sequence prediction models 120 and the frame prediction models 130.

As shown in FIG. 2A, the system 200*a* includes an input device 205. The input device 205 receives user input and provides the user input to client 105. The input device 205 can include a keyboard, mouse, microphone, stylus, game controller, joy stick, hand/or any other device or mechanism used to input image data to an application or user interface on a client, such as client 105. In some embodiments, the input device 205 can include haptic, tactile or voice recognition interfaces to receive the user input, such as on a small-format device. During the training phase, user input can be provided via an input device 205 to annotate ground-truth segmentation masks on the image data for use as training data. During the prediction phase, the input device 205 can be a camera configured to acquire images in the IR light spectrum. In some embodiments, the input device 205 can include a camera configured to acquire and generate image data in the visible light spectrum. In some embodiments, the camera 205 can be mounted in a fixed position relative to the plume of gas, such as a camera affixed to a stationary pole. In some embodiments, the camera 205 can be positioned on a mobile platform that is in motion relative to the plume of gas. For example, the camera 205 can be mounted on a mobile platform such as a manned ground vehicle, an unmanned ground vehicle, a manned aerial vehicle, an unmanned aerial vehicle, a manned surface vehicle, an unmanned surface vehicle, a manned underwater vehicle, an unmanned underwater vehicle, on a robot, on a drone, or the like. In some embodiments, the camera 205 can be carried to and operated from a fixed position relative to the plume of gas by a human. In some embodiments, the camera 205 can be attached to a human.

The system 200*a* also includes a client 105. The client 105 communicates via the network 235 with the server 115. The client 105 receives input from the input device 205. The client 105 can be, for example, a large-format computing device, such as large-format computing device 105 as described in relation to FIG. 1, a small-format computing device (e.g., a smartphone or tablet), such as small-format computing device 105, or any other similar device having appropriate processor, memory, and communications capabilities to transmit image data. The client 105 can be configured to receive, transmit, and store image data associated with generating plume analysis data based on the image data received from client 105. The client 105 can be configured with one or more software applications. The software applications can include web-based applications as well as applications that can be directly hosted or configured on the client 105. For example, the software applications can include technical computing applications, modeling and simulation applications, camera monitoring and configuration applications, image processing applications, and industrial asset management applications, or the like. In some embodiments, the client 105 can include a camera, such as an IR camera or a visible light camera, which can be configured with appropriate wired or wireless communication interfaces necessary to transmit image data to the server 115.

As further shown in FIG. 2A, the client 105 includes a processor 215 and a memory 220. The processor 215 operates to execute computer-readable instructions and/or data stored in memory 220 and transmit the computer-readable instructions and/or data via the communications module 230. The memory 220 can store computer-readable instructions and/or data associated with generating plume analysis data based on the received image data. For example, the memory 220 can include a database of image data received by the client 105, such as a database 110 as shown in FIG. 1. The memory 220 includes an application 225. The application 225 can be, for example, a camera monitoring application configured to receive image data from one or more cameras coupled to an industrial asset and to the client 105 for use in determining the presence of a plume of gas or a leak associated with the industrial asset.

As shown in FIG. 2A, the client 105 includes a communications module 230. The communications module 230 transmits the computer-readable instructions and/or the image data stored on or received by the client 105 via network 235. The network 235 connects the client 105 to the server 115. The network 235 can include, for example, any one or more of a personal area network (PAN), a local area network (LAN), a campus area network (CAN), a metropolitan area network (MAN), a wide area network (WAN), a broadband network (BBN), the Internet, and the like. Further, the network 235 can include, but is not limited to, any one or more of the following network topologies, including a bus network, a star network, a ring network, a mesh network, a star-bus network, tree or hierarchical network, and the like.

As further shown in FIG. 2A, the server 115 operates to receive, store and process the computer-readable instructions and/or the image data generated and received by client 105. In some embodiments, the server 115 can receive image data directly from one or more clients 105. The server 115 can be any device having an appropriate processor, memory, and communications capability for hosting a deep learning process. In certain aspects, one or more of the servers 115 can be located on-premises with client 105, or the server 115 can be located remotely from client 105, for example in a cloud computing facility or remote data center. The server 115 includes a communications module 240 to receive the computer-readable instructions and/or the image data transmitted via network 235. The server 115 also includes one or more processors 245 configured to execute instructions that when executed cause the processors to train a predictive model or network during the training phase of a deep learning process and to determine plume analysis data based on the received image data during the prediction phase of a deep learning process. In some embodiments, the processor 245 can be a graphical processing unit (GPU). The improved plume prediction system described herein can leverage the processing power of GPUs to reduce model training time and increase prediction execution time. In some embodiments, the server 115 and/or one or more processors 245 can be configured on a mobile platform such as a manned ground vehicle, an unmanned ground vehicle, a manned aerial vehicle, an unmanned aerial vehicle, a manned surface vehicle, an unmanned surface vehicle, a manned underwater vehicle, an unmanned underwater vehicle, on a robot, on a drone, on a mobile platform attached to a human in motion, or the like. In this way, image data from the camera 205 can be directly provided to the one or more processors 245 which can be configured on a variety of mobile platforms to receive image data and to determine, provide and/or transmit plume analysis data.

The server 115 also includes a memory 250 configured to store the computer-readable instructions and/or image data associated with generating plume analysis data based on the received image data. In some embodiments, the memory 250 can store data which may be used in the training phase of the deep learning process. For example the memory 250 can store time-series datasets of image data, such as datasets including individual, sequences, or files of video streams associated with a plume of gas being observed over time. Additionally, or alternatively, the memory 250 can store image data that has been received from customers in real-time or near real-time, as well as previously provided image data. In some embodiments, memory 250 can store one or more training models, such as the training models 270 used during the training of a deep learning process to generate a trained prediction models, such as the frame sequence prediction models 120 and the frame prediction models 130 configured to generate frame sequence prediction data 155 and frame prediction data 165, respectively as shown in FIG. 1, that corresponds to the image data provided via application 225. In some embodiments, memory 250 can store one or more trained models, such as the frame sequence prediction model 120 and the frame prediction model 130 that were similarly generated during a deep learning process and were trained to generate plume analysis data for different types of cameras, industrial assets, gas types, plumes shapes, and/or camera platform configurations. In some embodiments, the memory 250 can store one or more deep learning algorithms or networks that will be used to generate one or more training models 270. In some embodiments, the memory 250 can store image data that may be received from client 105 over a period of time and can be used as a training dataset in the deep learning process in order to train a prediction model. In some embodiments, the memory 250 can store one or more trained prediction models, such as variants of the frame sequence prediction models 120 and/or the frame prediction models 130 that may be used to generate plume analysis data including the ground-truth and plume prediction segmentation masks included in the plume analysis data, respectively, based on image data.

As shown in FIG. 2A, the server 115 includes a model training system 255. The model training system 255 functions in a deep learning process to receive image data as training inputs, e.g. training data, and processes the inputs to train one or more training models. In some embodiments, the training data can also include ground-truth segmentation masks which have been generated for a particular sequence of image frames, for example an 8-frame sequence, as well as ground-truth segmentation masks which have been generated for individual image frames. In some embodiments, the ground-truth segmentation masks for image frame sequences, or for individual image frames may be generated by one or more prediction models, such as trained prediction models 120 and/or 130. The ground-truth segmentation masks which are generated by one or more prediction models can be reviewed manually to determine the accuracy of the predicted ground-truth segmentation masks. In some embodiments, the ground-truth segmentation masks for image frame sequences, or for individual image frames may be generated manually via operators interacting with a GUI. The training data is used to train a deep learning algorithm or network in a deep learning process in order to generate a model capable of predicting spatial and temporal characteristics of a plume as plume analysis data, such as frame sequence prediction data 125 and frame prediction data 135 based on a variety of received image data.

The model training system 255 includes a data selector 260, a model trainer 265, and one or more training models 270. In some embodiments, the training models 270 that are generated and output as a result of the deep learning processes are configured on server 115 as stand-alone components on server 115. For example, the trained frame sequence prediction models 120 and the frame prediction models 130 that are configured on server 115 to process the image data and generate a plume analysis data for a sequence of image frames or for individual image frames, respectively. In some embodiments, the trained frame sequence prediction models 120 and the frame prediction models 130 are stored in memory 250 on server 115.

The model training system 255 is configured to implement a supervised deep learning process that receives image data as training input and generates a training model that can be subsequently used to predict plume analysis data based on image data that may be received by one or more of the clients 105. The components of the deep learning process operate to receive image data as training input, select unique subsets of data within the image data, use a deep learning algorithm or network to train a model based on the subset of data in the training input and generate a training model that can be output as a trained prediction model used for future predictions based on a variety of received image data.

The model training system 255 can also be configured to receive annotation data such as ground-truth segmentation masks, which have been generated by manually by humans. In some embodiments, humans observe each image frame sequence, and delineate the plume in each frame or delineate the last frame per-8-frame sequences. The annotation data can also include quantification data such as a designation of emission size (e.g., a small, medium, or large emission). The annotation data can also include a leak rate prediction, such as 10 standard cubic feet per hour (scfh) or 20 scfh etc. In some embodiments, humans can observe videos of controlled leaks with known leak rates to determine how plumes look like at various leak rates. The videos including controlled leaks with known leak rates can be included in calibration libraries. In some embodiments, the calibration libraries can be used to generate training data for leak rate prediction.

As shown in FIG. 2A, the model training system 255 includes a data selector 260. The data selector 260 operates in the supervised deep learning process to receive the image data and to select a subset of data from the inputs which will be provided as training inputs to a deep learning algorithm or network. In some embodiments, the data selector 260 can select a subset of data corresponding to different types of cameras, camera orientations, or camera platform configurations used to generate and provide the image data such that the deep learning algorithm or network will be trained to generate plume analysis data, such as plume prediction segmentation masks based on the selected subset of data. In some embodiments, the data selector 260 can select a subset of data or features corresponding to the type of image data provided as inputs to the clients 105, such as data that may be related to individual frames, sequences of frames, files of streaming video, as well as configurations of the industrial asset being monitored or inspected for leaks.

During the supervised deep learning process, the data selector 255 provides the selected subset of data to the model trainer 265 as inputs to a deep learning algorithm or network to generate one or more training models. During the training aspect of the supervised deep learning process, the model trainer 265 can receive the training input including the selected subsets of data of the image data from the data selector 260 and can iteratively apply the subsets of features to the previously selected deep learning algorithm or network to assess the performance of the algorithm or network. As the supervised deep learning algorithm processes the training input, the model trainer 265 learns patterns in the training input that map the deep learning algorithm variables to the target output data (e.g., the frame sequence prediction data 125 and the frame prediction data 135) and generates a training model 270 that captures these relationships. During model training, the camera configuration (e.g., the type, orientation, location, and platform-type) can be used to generate new models which are trained in regard to one or more configurations of the camera 205.

A wide variety of deep learning algorithms can be selected for use including algorithms or networks such as spatio-temporal U-Nets and spatio-temporal U-Nets-Full. Spatial U-Nets are deep learning algorithms which can be configured to semantically segment image data. Spatial U-Nets are pixel-wise segmentor networks based on fully convolutional networks. U-Nets supplement traditional contracting networks by successive layers of expansion where pooling operations are replaced by up sampling operations which cause the layers to increase the resolution of the output incrementally where the final output layer matches the resolution of the input image. The feature channels in the up sampling portion are symmetric with respect to the contracting part and copy features from corresponding contracting part so that context and detail of each contracting layer is utilized by an up-sampling layer. Only convolutional layers are used without any fully connected layers. This allows prediction of plume segmentation masks of any resolution that correspond to input image data of any resolution. The purpose of the output expansion is to generate a detailed pixel-wise prediction mask that segments out the fine details of the shapes of patterns of interest in the input images well. The spatial-temporal U-Net (ST-U-Net) and spatial-temporal U-Net-Full described herein include novel deep learning algorithms not previously known.

As shown in FIG. 2A, the trained frame sequence prediction models 120 that were generated as a result of performing the supervised deep learning training process, can receive image data and process the inputs to output plume analysis data that can be optimized based on the sequences of image frames included in the received image data and/or the clients 105 on which the image data were received or stored. For example, the trained frame sequence prediction models 120, that were produced in the supervised deep learning training process, can be subsequently included in an artificial intelligence system or an application configured to receive sequences of image data, for example streaming video, as prediction inputs and process the data to output predicted plume measurements as segmentation masks that are indicative of the spatial and temporal characteristics of the plume being observed. In some embodiments, the processor 245 can store the plume analysis data that was output from the trained frame sequence prediction models 120 in memory 250. In other embodiments, the outputted plume data can be forwarded to communications module 240 for transmission to the client 105 via network 235. Once received by the client 105, the outputted plume analysis data associated with a sequence of image frames can be transmitted to output device 210, such as a display, printer, portable hard drive or other storage device.

The frame sequence prediction models 120, implemented as spatio-temporal U-Nets can output a prediction mask per 8-frame sequence separating plume pattern from all other phenomena. In some embodiments, the camera 205 can collect 15-30 frames per second while observing a plume inspection point. The frame sequence prediction models 120 can generate predictions from a plurality of 8-frame sequences. The results can be combined or a result from one of those sequences can be selected based on a variety of criteria as the output mask of the prediction. During training phase, the ground-truth mask of the last frame in an 8-frame sequence is used to train the spatio-temporal U-Net network. During the training phase of the deep learning process, an energy function of U-Net is used where a pixel-wise soft-max over the final feature map is combined with the cross-entropy loss function. Since this is a relatively shallow network, no weight initialization schemes with other tasks such as compression-decompression are used but rather all weights are initialized randomly. Requiring one ground-truth segmentation mask per 8-frame sequence is advantageous as it reduces the amount of annotation required to create training datasets.

In some embodiments, the spatio-temporal U-Net framework is capable of quantifying the detected plume by means of multiple output channels in the output plume prediction segmentation mask. If there is only one output channel, then the plume prediction segmentation mask can be configured to assign a plume and a no-plume binary classification to each pixel. The pixels which have a "1" in the output channel can be classified to have a plume, while the pixels which have a "0" in the output channel can be classified to have no-plume. If there are three channels in the plume prediction segmentation mask, then the plume prediction segmentation mask can be configured to assign pixels into one of small, medium, high leak size categories or into a no-plume category. The pixels which have a "1" in the first channel can be assigned to a small leak size category. The pixels which have a "1" in the second channel can be assigned to a medium leak size category. The pixels which have a "1" in the third channel can be assigned to a high leak size category. The pixels which have a "0" in all output channels can be assigned to a no-plume category. In semantic segmentation tasks, one-hot class-encoded target vectors can be used per pixel. In this manner, several leak size brackets or categories can be configured to achieve even more granular quantification levels. The spatio-temporal U-Net framework can be set up to learn and predict each bracket from training data that includes such granular ground-truth leak sizing information. The ground-truth leak sizing data can be estimated and annotated by expert humans or it can be measured through controlled gas emission data collection experiments. Once set up with multiple output channels, spatio-temporal U-Nets can provide plume detection and quantification by means of leak sizing during the prediction phase. A single attribute corresponding to a leak size estimation, such as a small, medium or high leak size, can be assigned to the detected plume by examining output channels of the plume prediction segmentation masks in one or more frames of image data.

As shown in FIG. 2A, the server 115 can also include one or more trained frame prediction models 130. The frame prediction models 130 can be trained in a supervised deep learning process configured on the server 115. During the supervised deep learning process, the frame prediction models 130 can be trained to receive individual frames of image data as inputs to a predictive model trained to generate plume analysis data including segmentation masks that are indicative of the spatial and temporal characteristics of the plume being observed for the individual image frames. The frame prediction models 130 can be implemented using an alternative spatio-temporal U-Net network called a spatio-temporal U-Net-Full. This network implements a slight variation to the decoder network architecture of the spatio-temporal U-Net, where the network outputs one mask for each frame in a given 8-frame input sequence. With this variation, all 8 ground-truth masks are used by the loss function to train the network and can improve pixel-wise precision over the ST-U-Net used to implement the frame sequence prediction models 120.

Figure 2B:
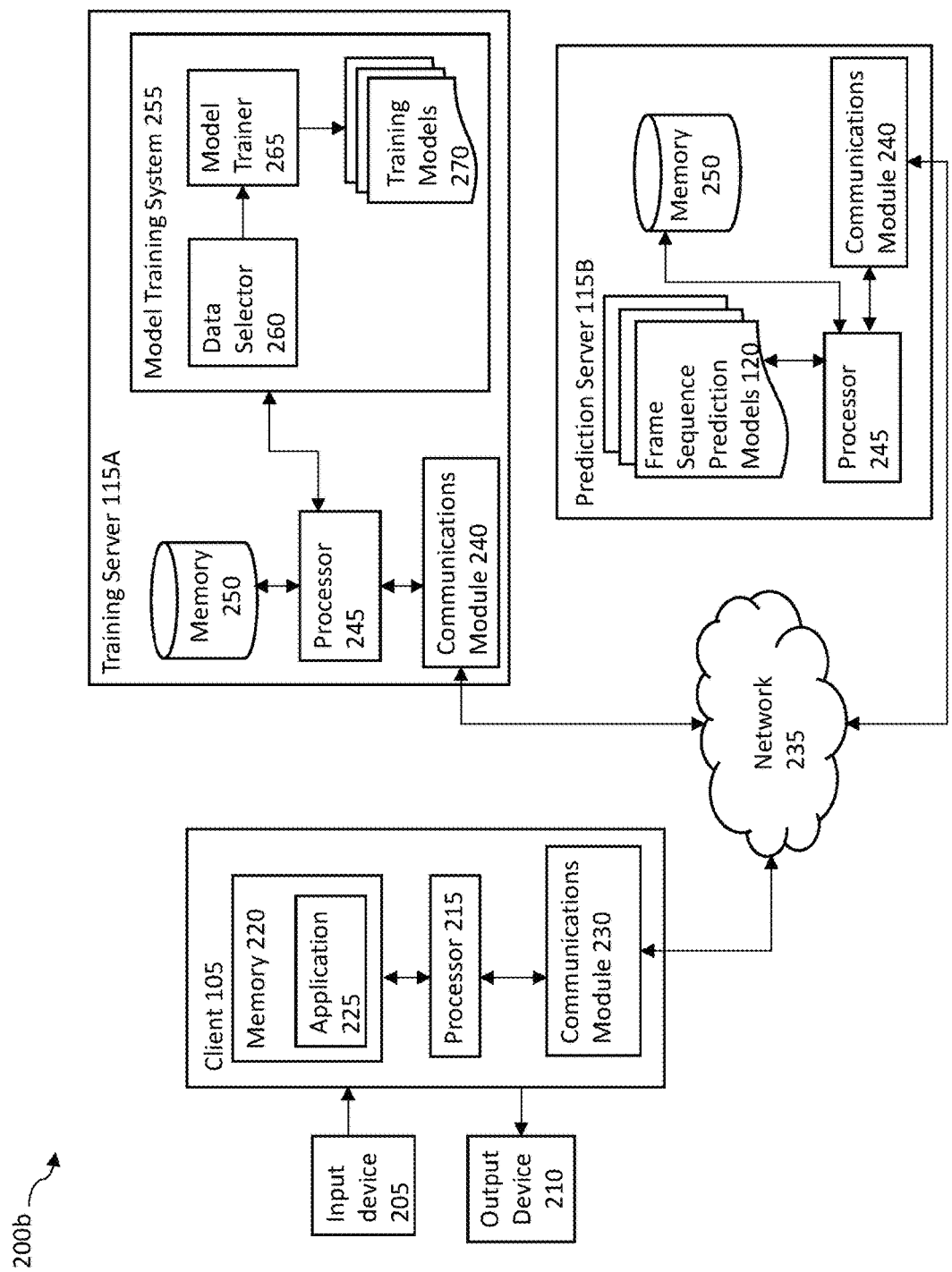

FIG. 2B illustrates an example block diagram of a system 200b using a deep learning process configured on a model training server 115A. The individual components and functionality of each component shown and described in relation to model training server 115A in FIG. 2B are identical to the components and respective functionality shown and described in relation to server 115 of FIG. 2A with the exception that the model training server 115A shown in FIG. 2B does not include one or more trained frame sequence prediction models 120 or one or more trained frame prediction models 130 as shown in FIG. 2A.

Instead, as shown in FIG. 2B, the system 200b includes a training server 115A that is configured separately from the trained prediction models, e.g., the frame sequence prediction models 120, that are now configured on the prediction server 115B. The prediction server 115B includes components and functionality similar to the server 115 shown in FIG. 2A with the exception that the prediction server 115B shown in FIG. 2B does not include a model training system, such as the model training system 255 shown in FIG. 2A. The prediction server 115B shown in FIG. 2B includes one or more trained prediction models. The trained prediction models configured on the prediction server 115B include the frame sequence prediction models 120 and can further include the frame prediction models 130, algorithms, networks, or the like that were generated from a deep learning process, such as training models 270 and have been trained in the deep learning process to generate plume analysis data based on image data provided to or stored on a client 105. For example, upon receiving image data from a client, for example client 105, the frame sequence prediction models 120 can be employed to generate one or more predicted measurements associated with spatial and temporal characteristic of a plume being monitored, inspected, or otherwise observed based on sequences of image frames in the received image data. Similarly, the frame prediction models 130, although not shown in the prediction server 115B can also be configured on the prediction server 115B. The frame prediction models can be employed to generate one or more predicted measurements associated with spatial and temporal characteristic of a plume being monitored, inspected, or otherwise observed based on individual image frames in the received image data. In some embodiments, each of the frame sequence prediction models 120 and the frame prediction model 130 can generate plume analysis data based on a specific input format of the image data such as time-based animations of the ground-truth and plume prediction segmentation masks over a period of time including a minute, hour, 12-hours, a day, multiple days, a week, a month, or a year.

As shown in FIG. 2B, system 200b also includes a training server 115A. The training server 115A includes a model training system 255 which implements a supervised deep learning process and includes a data selector 260, a model trainer 265, and one or more training models 270. In some embodiments, the training server 115A can be located in the same location as prediction server 115B. In other embodiments, the training server 115A can be located in a remote location, for example in a second data center that is separately located from the data center or client location where the prediction server 115B is located. In some embodiments, the training system 255, configured on the training server 115A, can be utilized to evaluate different deep learning algorithms or networks and can generate one or more alternate training models 270. For example, based on using different subsets of features in the received image data as the training inputs to a different deep learning algorithm and process, the model training system 120 can train and output a different training model 270 than the trained frame sequence prediction models 120 and/or the trained frame prediction model 130 configured on prediction server 115B which can have been trained using a separate deep learning algorithm and process.

The training system 255 can also be configured with a deep learning process to train and output one or more frame sequence prediction models 120 and frame prediction models 130 that are capable of generating plume analysis data based on historical image data which may have been provided by a user in the past and can be stored in memory 220 or memory 250. In some embodiments, the training system 255 can generate a model, such as trained frame sequence prediction models 120 and trained frame prediction models 130 which can be capable of generating plume analysis data when one or more features of the image data which are traditionally used to determine a particular aspect of the plume analysis data for sequences of image frames or individual image frames are not available. For example, the plume analysis data generated for a specific plume of gas or industrial asset emitting the plume of gas can be optimized based on the image data which may only partially identify image features used to generate the ground-truth segmentation mask or the plume prediction segmentation mask, for example by a portion of the image frames included in a sequence of image frames or an image frame including occluding foreground or background features corresponding to a particular plume of gas as opposed to a more complete data set of image data received for a full sequence of image frames or a more visible, un-occluded individual image frame.

The training system 255 can also be configured with a supervised deep learning process to train and output multiple models or network, such as the frame sequence prediction models 120 and the frame prediction models 130 that have been trained in the deep learning process based on non-overlapping or partially overlapping sets of training data. In some embodiments, the different sets of training data that are associated with multiple models or networks can be implemented on the prediction server 115B to create a more robust system that includes an ensemble or collection of models or networks. In such embodiments, the prediction server 115B can generate plume analysis data for sequences of image frames or individual image frames based on image data acquired during different seasons, different times of the year, and at predetermined intervals. Additionally, or alternatively, the prediction server 115B can generate plume analysis data for sequences of image frames or individual image frames based on image data associated with different image data formats, image data file types, production environment operators, customers, types of gases, plume formations, camera types, camera platform configurations, thermal profiles, environmental conditions, geographic locations, industrials assets, or other statistically correlated patterns observed in the received image data. In this way, the model or ensemble of models can be trained to generate plume prediction data as outputs in situations when certain image data which are used in a given prediction model may be missing or incomplete.

Figure 3:
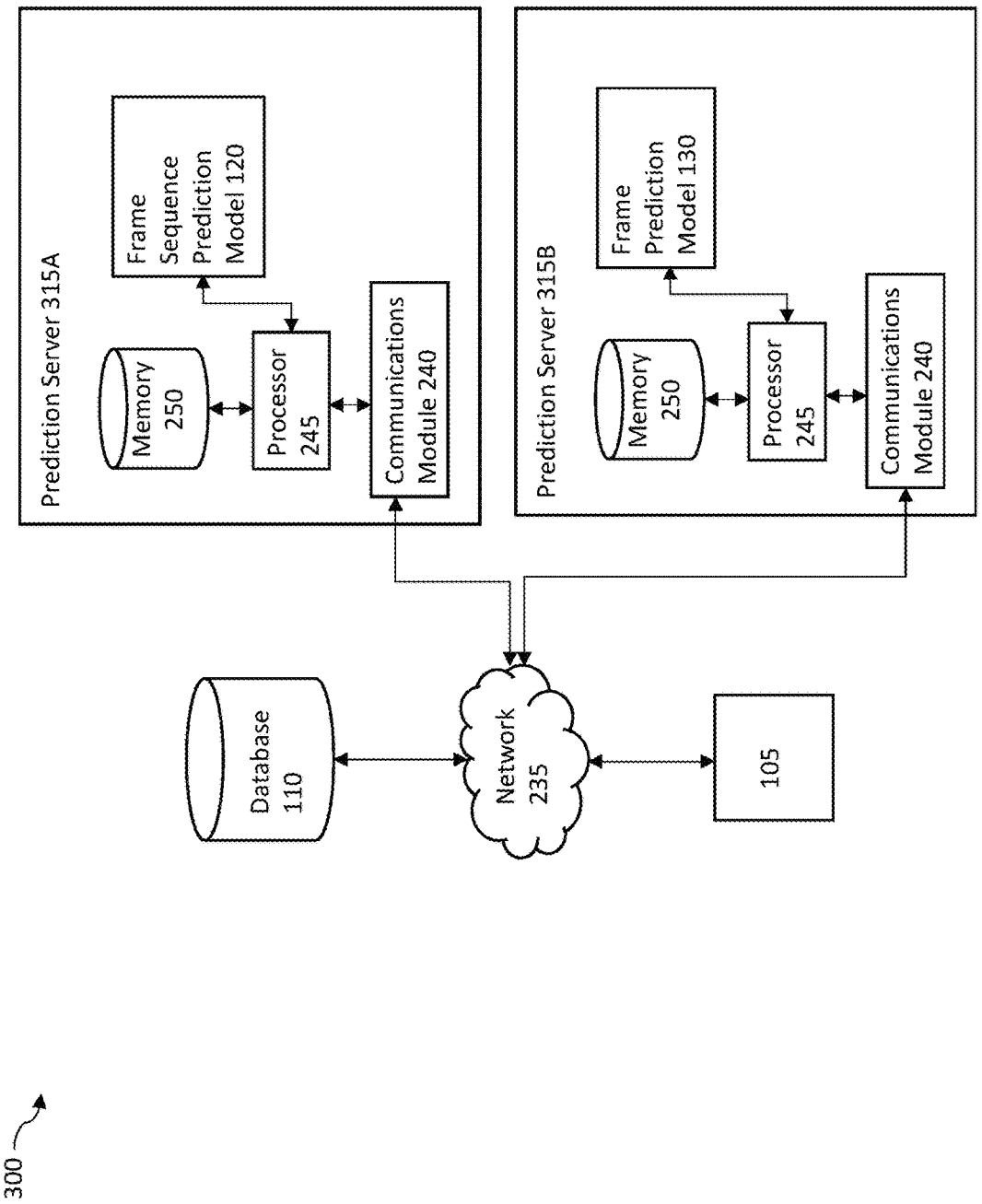
FIG. 3a is a block diagram illustrating one exemplary embodiment of an architecture for training a model to generate plume analysis data based on image data received as inputs.

FIG. 3 is a block diagram illustrating the example client and server from the architecture of FIG. 1 in an exemplary deployed plume prediction system 300. The block diagram of the deployed plume prediction system 300 includes an example client 105 similar to the client described in relation to architecture 100 of FIG. 1. The deployed plume prediction system 300 also includes a prediction server 315A configured with one or more trained frame sequence prediction models 120 and a second prediction server 315B, deployed remotely or separately from the prediction server 315A. For example, prediction server 315A can be configured in a cloud computing environment associated with the production operators' primary data center. Prediction server 315B can be configured in a computing environment located at a gas distribution facility that can be coupled to the industrial assets being observed for leaks. The prediction server 315B can be configured with a frame prediction model 130. The prediction servers 315A and 315B are similar to the prediction server 115B described in relation to the system 200b of FIG. 2B, according to certain aspects of the disclosure.

As shown in FIG. 3, the client 105, the database 110, and the servers 315A and 315B are connected over the network 235. The client 105 and each of the servers 315A and 315B can be configured to exchange data that can be used to determine plume analysis data associated with a plume of gas being observed by a camera. Plume analysis data generated by prediction server 315A can include ground truth and plume prediction segmentation masks delineating the observed and predicted spatial characteristics of the plume for a sequence of image frames as a function of time. The generated plume analysis data can be overlaid on sequences of images of the received image data to assist in visualizing the spatial deformations of the gas plume in the sequence of image frames. In some embodiments, the plume analysis data can also be used to generate alerts or notifications based on determining anomalous plume conditions present in the received image data. Additionally, the client 105 and the servers 315A and 315B may share image data stored in database 110 that can be used in the deployed prediction 300 in order to generate plume analysis data based on stored image data. The image data stored in the database 110 can include customer provided image data, historical image data, as well as image data that is associated with different configurations of cameras, camera mounting platforms, gas types, weather or environmental characteristics, thermal models, industrial assets or configurations thereof, or the like.

The servers 315A and 315B each include a communications module 240, a processor 245, and a memory 250 that includes one or more machine readable storage mediums containing program instructions for causing a computer to generate plume analysis data based on image data. The processors 245 of the servers 315A and 315B are configured to execute instructions, such as instructions physically coded into the processors 245, instructions received from software in memory 250, or a combination of both. For example, the processor 245 of the server 315A can execute instructions to generate the plume analysis data based on image data that may be output to a client 105. Similarly, the processor 245 of the server 315B can execute instructions to generate plume analysis data based on image data that may be output to a client 105.

The techniques described herein may further be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 4:
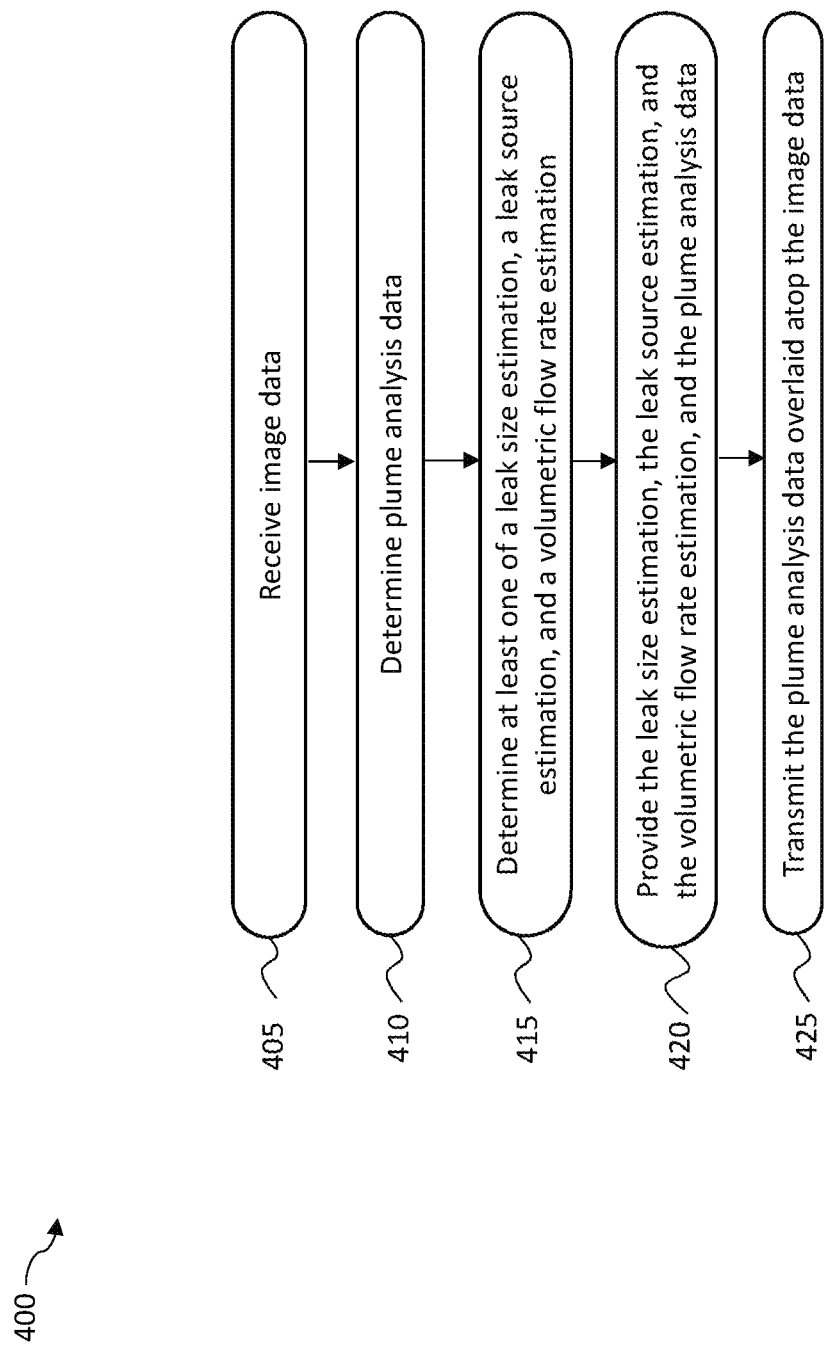
FIG. 4 is a flowchart illustrating one exemplary embodiment of a method for generating plume analysis data using image data and a predictive model using the client/server architecture of FIG. 1.

FIG. 4 is a flow diagram illustrating an exemplary embodiment of a method 400 for generating plume analysis data based on image data using the client/server architecture described in relation to FIGS. 1, 2A, and 2B and the trained frame sequence prediction models 150 and/or the trained frame prediction models 160 generated in a deep learning process using the training system 200a and 200b, as shown and described in relation to FIGS. 2A and 2B. In certain aspects, embodiments of the method 400 can include greater or fewer operations than illustrated in FIG. 4 and the operations can be performed in a different order than illustrated in FIG. 4.

For example, in operation 405, a client 105 receives an input including a plurality of image data. The image data may include one or more frames of images captured using an IR camera, a visible-light camera, or a configuration of an IR and a visible-light camera. Using IR image data, the plume prediction system can separate out low level spatial patterns with temporal coherence from other movements or features which may be present in the background or foreground of the acquired image. For image data received as visible-light spectrum, RGB images, the images can be turned into greyscale images using standard image processing techniques and then directly fed into the trained prediction models.

The image data can be associated with a plume of gas that may be emitted from an industrial asset in an oil and gas production environment, or any other gas processing and distribution environment. The image data may be received by the client 105 in regard to a previously detected leak or in regard to initiation of an inspection procedure at the site where the gas leak may be suspected. The client 105 can receive image data observing the site at which the plume of gas is present directly from a fixed camera or from a camera mounted to a mobile platform. For image data received from a camera mounted on a mobile platform, the stream of input image frames would be stabilized using standard computer vision techniques before being provided as inputs to the trained prediction models. This is possible because the depth of the plume will remain approximately the same relative to the camera so that stabilization artifacts on the plume would be minimal. In addition, the camera is moving slowly enough to generate 8 frames in a sequence in order to observe the plume. In the event stabilization artifacts are present, with sufficient training data from cameras on mobile platforms, the deep learning process can learn to separate out plumes despite these artifacts on the plume and/or on other parts of the observed scenes.

In some embodiments, a client 105 can receive the image data from a database, such as database 110. The image data may be historical image data or may be live, streaming image data that is received by the client in real-time or near real-time.

Upon receiving the image data, the client 105 can transmit the image data to a server, such as server 115. In some embodiments, the image data can be transmitted to the server 115 as training data. In other embodiments, the image data can be transmitted to the server 115 as prediction data. During the training phase of a deep learning process, the client 105 and/or the database 110 can transmit the input as training data to the model training server 115A of FIG. 2B. During the prediction phase of the deep learning process, the client 105 and/or the database 110 can provide prediction data to the prediction server 115B of FIG. 2B. The inputs can be transmitted from the client 105 and/or the database 110 to the server 115 via the network 235.

In operation 410, the server 115 determines plume analysis data. The server 115 determines plume analysis data based on image data via the frame sequence prediction models 120 and/or the frame prediction models 130. When the server 115 receives prediction data 125, the server 115 can apply the trained frame sequence prediction model 120 generated as a result of the training phase of the deep learning process to the transmitted inputs and can generate plume analysis data for a sequence of image frames. The frame sequence prediction model 120

Alternatively, the server 115 can apply the trained frame prediction model 130 generated as a result of the training phase of the deep learning process to the transmitted inputs and can generate plume analysis data for individual image frames. The plume analysis data can include frame sequence prediction data 125 and/or frame prediction data 135, each of which can include ground-truth segmentation masks and plume prediction segmentation masks delineating pixel-wise boundaries of the observed and predicted deformations of the plume of gas in time, for either a sequence of image frames or individual image frames.

The frame sequence prediction model 120 can include a spatio-temporal U-Net network consisting of an encoder followed by a decoder unit which can include spatial and temporal convolutions during the encoding phase and transpose convolutions during the decoding phase. As explained in greater detail in the Experimental Results section below, for an 8-frame sequence provided as an input, the input layer can include spatial convolutions, generating eight activation maps $A^1, A^2, \ldots, A^8$ with shared weights applied to each of the eight frames. If the plume patterns exhibited linear temperature profiles, then plume could be separated from other phenomena by just calculating the slope using equation (1) below.

$$m = \frac{T_2 - T_1}{t_2 - t_1} = w_2 T_2 + w_1 T_1 \quad (1)$$

Using any gradient descent optimizer, there exists weights $w_2, w_2$ which can be trained to represent $w_1 A^1 + w_2 A^2 + \ldots + w_8 A^8$ as the plume heat transfer pattern. A single 3D convolutional layer would be able to represent this sum and learn the necessary slopes in temporal dimension. However, there are more complex non-linear variations in temperature profile of plume blobs over time. To mitigate this, a hidden layer can be added to introduce nonlinearity using nonlinear activation functions like a sigmoid function or a rectified linear unit (e.g., ReLU).

The frame sequence prediction models 120 use a 3-dimensional (3D) convolutional block with a hidden layer. The first stage consists of 16 filters with a kernel of size 3×1×1 and stride 2×1×1. Second 3D convolutional layer consists of 16 filters each with a kernel of size 3×1×1 and stride 2×1×1. From here onwards, all the 2-dimensional (2D) convolutional layers have kernel size 3×3 and stride 2×2 to halve the resolution and the number of filters is doubled after each stage.

For the decoding stage, feature maps from 6 stages of encoder are available. Each of these feature maps vary in degree of texture and context they capture. Starting from the 4×4×512 feature map of stage-6 which captures the highest context (largest receptive field), the resolution of the segmentation map is increased incrementally by incorporating higher context from ith stage with texture from $(i-1)^{th}$ stage. During the decoding stage, the 2D transpose convolutional layer has a kernel size of 3×3 and stride 2×2 to double the resolution and the 2D convolutional layer has a kernel size of 1×1 and stride 1×1.

Based on predicting the plume analysis data, the plume prediction system can be further configured to determine the presence of a leak as well as estimating the size of the leak. The frame sequence prediction models 120 and/or the frame prediction models 130 can further segment out gas leak plumes with different leak sizing. Training data from gas leaks with different leak sizes can be provided during the training phase of the deep learning process such that each image frame has a multi-class ground-truth segmentation mask that identifies pixels with different leak sizes with a different color encoding. In some embodiments, the color coding can include one-hot class encoding vectors. Each encoding can be uniquely assigned to a different color and can be visualized as a separate color when overlaid atop the original frame sequence of image data. For example, if there are three categories of leak size, three colors (red, green, and blue) can be used to correspond to high, medium, and small leak size categories. In embodiments, where there are more categories a red-hot color legend can be utilized for category assignment. In some embodiments, the frame sequence prediction models 120 and/or the frame prediction models 130 can be configured to generate the plume prediction masks as binary black and white masks. In this example, white color can be used to indicate the pixels associated with the plume and black color can be used to indicate the pixels associated with the background. In some embodiments, the frame sequence prediction models 120 and/or the frame prediction models 120 can be configured to generate plume prediction masks as multi-color segmentation masks, where each color may correspond to a different category of leak size such as small, medium or high.

In operation 415, the server 115 determines at least one of a leak size estimation, a leak source estimation, and a volumetric leak rate estimation for the plume of gas. Spatio-temporal U-Net plume prediction segmentation masks can be used to estimate a volumetric leak rate in units pixel cube per second for the plume by means of estimation of other characteristics from the plume. The velocity of particles in the imaged plume can be determined as the speed and direction of particles that go through one of the cross-sections of the plume prediction segmentation mask. The velocity of particles in the imaged plume can be determined via computer vision techniques, such as optical flow which produce dense velocity fields as output from two or more subsequent frames. These dense velocity fields record speed in units of pixels per second and direction of flow at each pixel. Given such velocity estimation, a cross-section of the plume can be identified and a diameter of the plume can be measured in units of pixels. Assuming gas disperses in a circular fashion in 3D around this 2D cross-section of the plume, the area of the cross-section can be estimated from the diameter of the cross-section in units pixel square. Based on the area and velocity estimations, a volumetric leak rate can be calculated in units of pixel cube per second as the volume of gas that is escaping in one second through that cross-section in the plume. Using the velocity estimation and the plume prediction segmentation mask, a source pixel or a region of source pixels can also be estimated. Leak source estimation can be beneficial for identifying components which may be leaking. The volumetric leak rate estimation in units pixel cube per second can be calibrated to units cubic feet per second by means of calibration of image pixels to a physical size in units of feet.

In operation 420, the server 115 provides the leak size estimation, the leak source estimation, the volumetric leak rate estimation as calculated outputs, which can be stored in memory as attributes of the plume analysis data. The prediction mask in plume analysis data can be provided as an overlay atop the image data. The server 115 determines plume analysis data based on the image data via the frame sequence prediction models 120 and/or the frame prediction models 130 and generates an overlay to be applied atop the image data such that the sequences of image frame data or individual image frames subsequently include the plume analysis data. In some embodiments, the overlay can include alerts, graphical indicators, or textual notifications, identifying one or more calculated attributes such as leak size estimation, the leak source estimation and the volumetric leak rate estimation for the identified plume of gas. The overlay may include such alerts or indications based on the server 115 determining one or more attributes of the plume prediction have reached values that are outside of predetermined values associated with expected characteristics of the plume of gas.

In operation 425, the server 115 transmits the plume analysis data overlaid atop the image data as well as any attributes that are calculated to the client 105 and/or the database 110 via the network 235. The client 105 can further provide the outputs to a user within an application from which the image data was received or for which the plume analysis data overlaid atop the image data can be viewed. In some embodiments, the client 105 can receive the plume analysis data overlaid atop the image data and further transmit the outputs to the database 110 for storage, thereby reducing the amount of memory resources needed at client 105. In this way, the database 110 can include newly generated plume analysis data outputs that can be added to a production operator's inspection and monitoring database which may be stored in database 110 and associated with one or more industrial assets at which the plume of gas was detected.

Experimental Results

The end-to-end deep learning framework proposed herein can process a sequence of IR images captured from a fixed or mobile camera that separates out low level spatial patterns with a temporal coherence from other types of movement or from the background.

Figure 5:
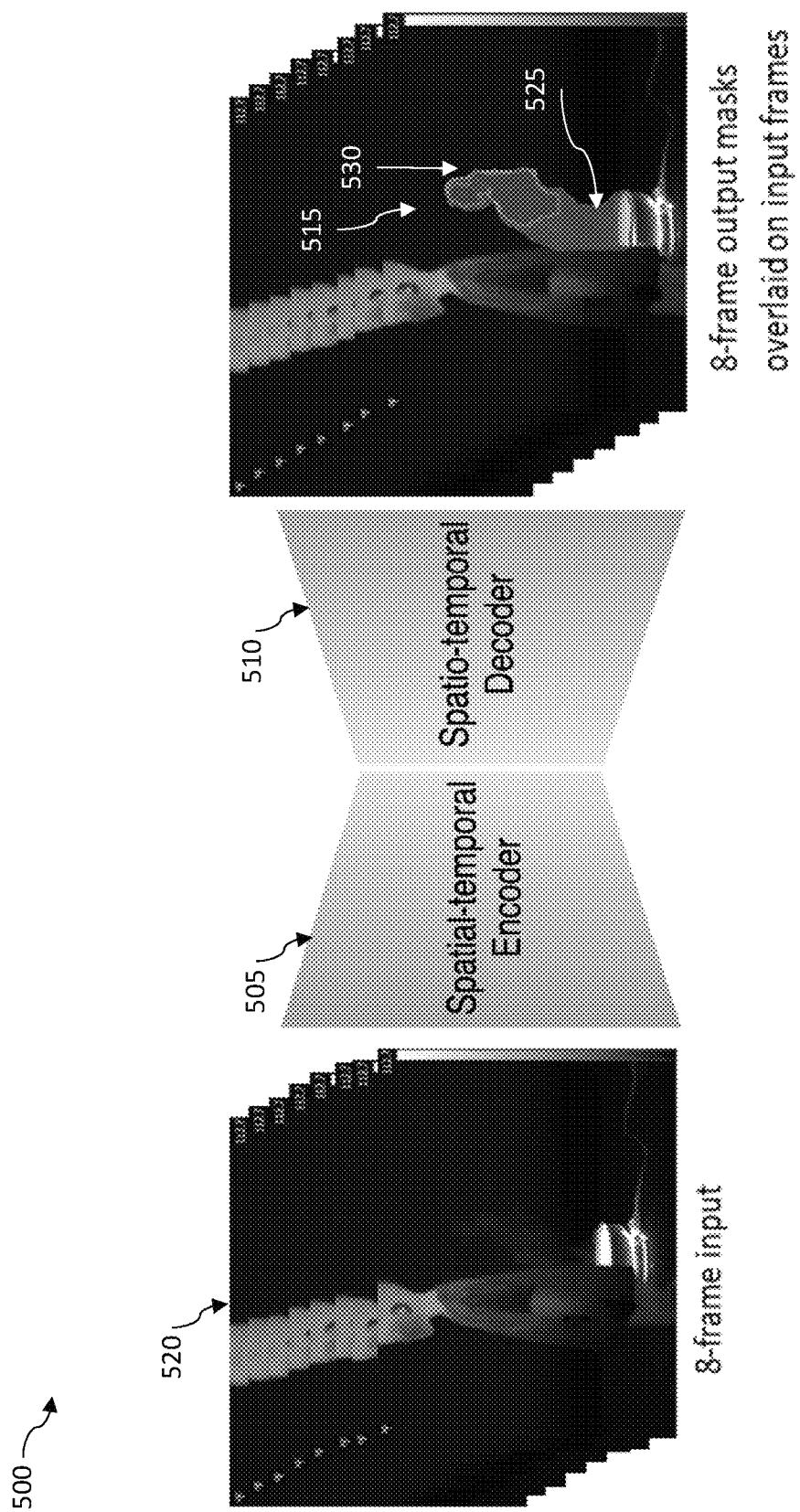
FIG. 5 is a diagram illustrating a spatio-temporal encoder-decoder network according to an exemplary embodiment described herein.

FIG. 5 is a diagram illustrating a spatio-temporal encoder-decoder network 500 including an encoder 505 followed by a decoder 510 that include spatial and temporal convolutions during the encoding phase and transpose convolutions during the decoding phase. As shown in FIG. 5, the spatio-temporal encoder-decoder network 500 can create a pixel-level mask 515 for each frame in an 8-frame input sequence 520. The output masks 505 can be different in each frame capturing the deformation of the plume in the input sequence. In this example, the plume can be water vapor, which is barely visible to human eye in the input sequence 520. The output mask 515 can include pixels 525 associated with the ground-truth plume annotation and pixels 530 associated with the plume prediction. The spatio-temporal encoder-decoder network 500 can be used for segmentation of plumes from different types of gas or steam in LWIR or MWIR video in both hot-foreground or cold-foreground scenarios. The spatio-temporal encoder-decoder network 500 can be a supervised technique which requires frame by frame ground-truth annotations in a set of training sequences.

In contrast, a network architecture can restrict decoding and encoding to spatial domain while capturing a temporal signature in the encoding space. Such an architecture can be accomplished as a combination of standard LSTM networks with decoders employed in semantic segmentation tasks such as DeConvNet and SegNet. With this architecture, LSTM can be limited to capturing temporal relations in the final high-level encoding space. Such a network can be used for use cases where the nature of temporal phenomena builds upon high abstractive concepts. For example, such high abstractive concepts can include head, limbs, etc., that are observed in human pose space for purposes of human action recognition and segmentation on a per-frame basis. However, the shape of the plume may not be semantically meaningful, or can include low abstraction, high texture and changes from frame to frame with no consistency across different exemplar plumes. Thus using a spatio-temporal encoder-decoder scheme as described herein can capture and isolate lower-level patterns. The spatio-temporal encoder-decoder scheme as described herein provides the benefits of extending a spatial U-net architecture to the temporal domain for purposes of creating pixel-wise segmentation masks from 8-frame sequences that capture low-level temporal phenomena such as deforming gas/steam plumes.

Figure 6:
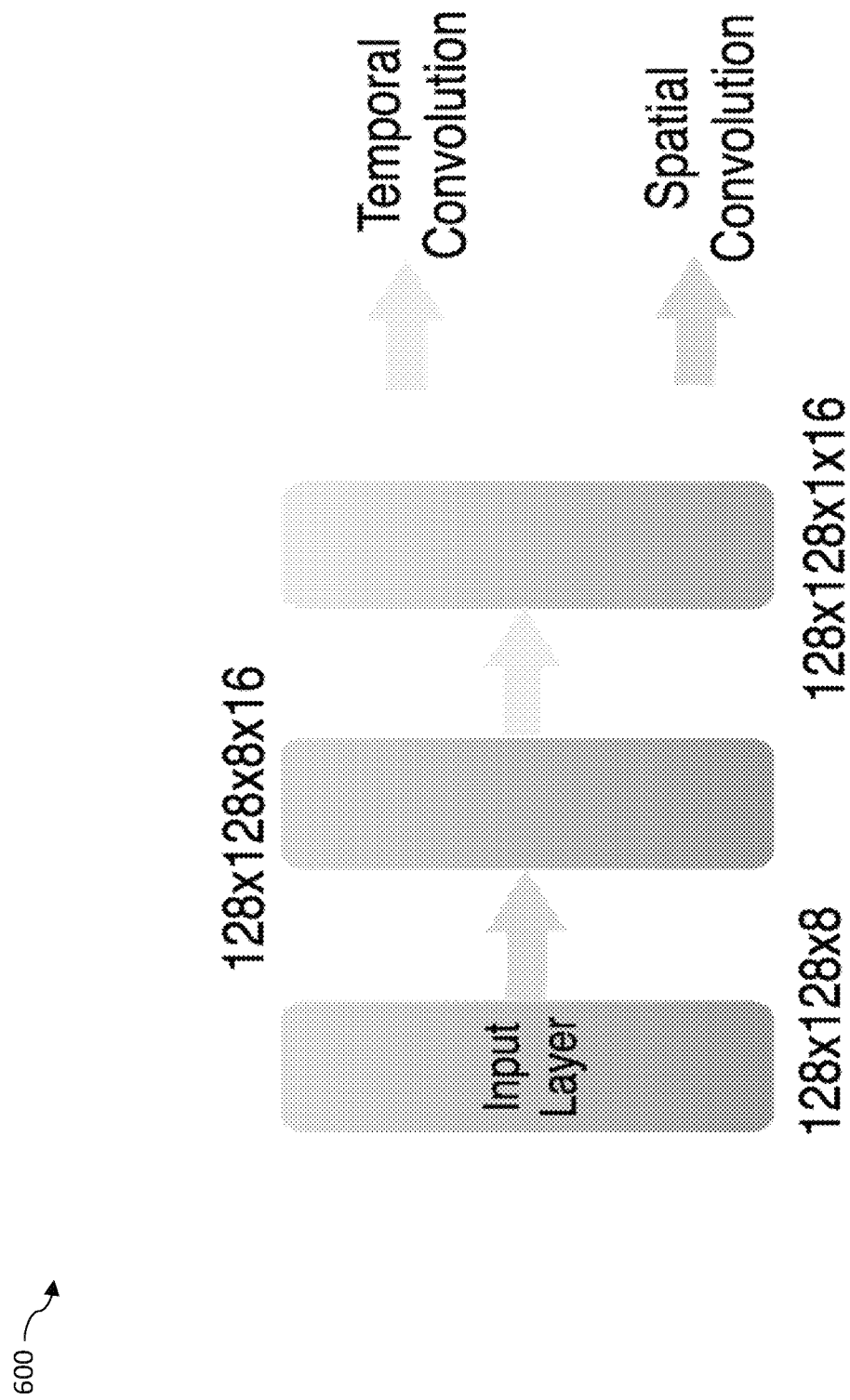
FIG. 6 is a diagram illustrating an input layer of a spatial U-net architecture as extended using the spatio-temporal encoder-decoder network described in relation to FIG. 5 according to an exemplary embodiment described herein.

FIG. 6 is a diagram 600 illustrating an input layer of the spatial U-net architecture as extended using the spatio-temporal encoder-decoder network 500 described in relation to FIG. 5. As shown in FIG. 6, the network can include 8 single channel frames with size 128×128 where spatial convolutions of kernel size 3×3 and stride 1×1 are applied to all frames. Convolution kernels applied to all eight frames have shared weights but there are 16 sets of kernels producing an output tensor of size 128×128×8×16. Although the description and figures include input frames of size 128 by 128, the size of the input layers can be extended to any size since the network entails only convolutions or deconvolutions and no fully connected networks.

Figure 7:
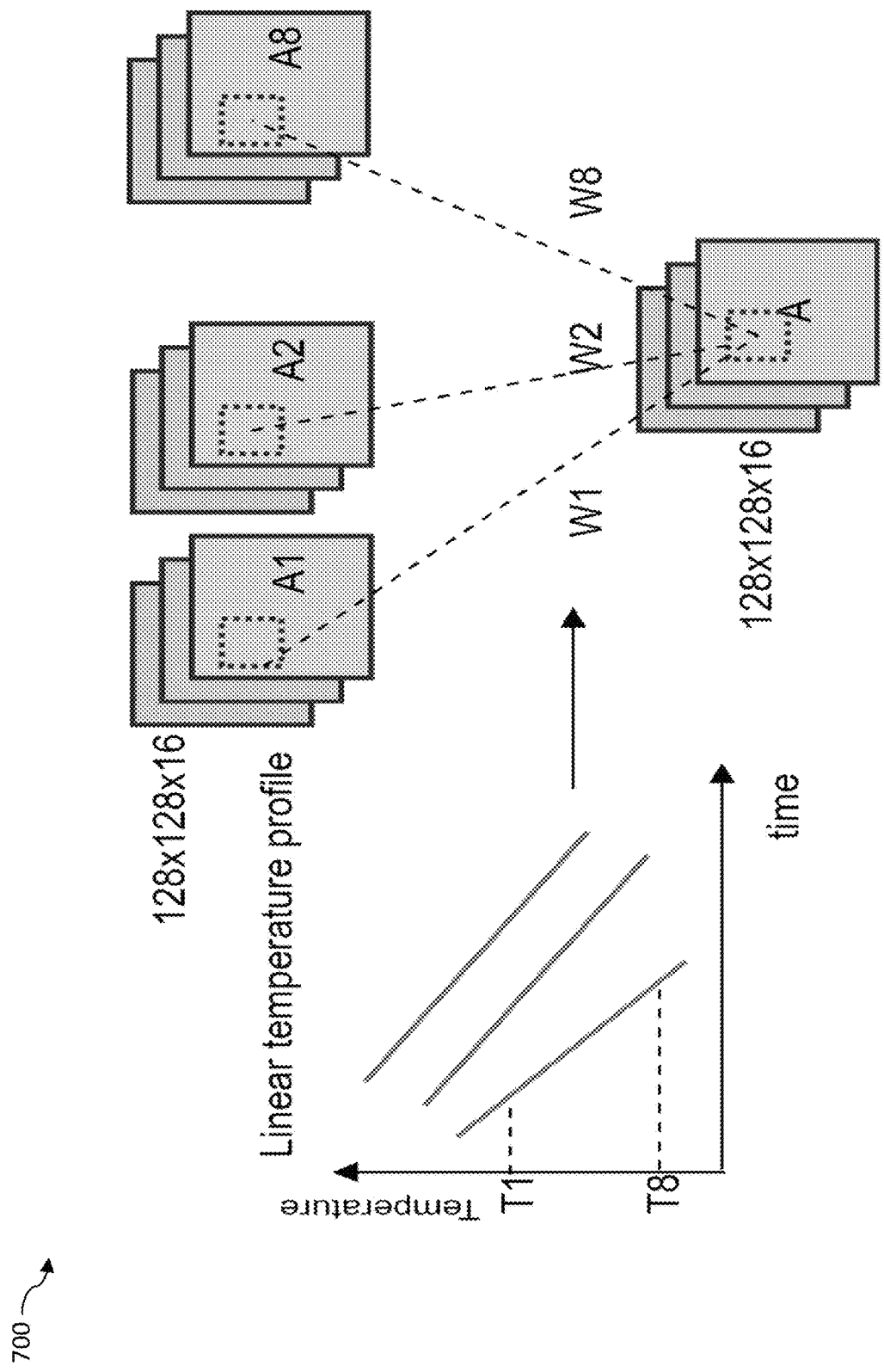
FIG. 7 is a diagram illustrating a 3D convolution with one layer capable of capturing differences between patterns of linear temperature variation profiles according to an exemplary embodiment described herein.

FIG. 7 is a diagram 700 illustrating a 3D convolution with one layer capable of capturing differences between patterns of linear temperature variation profiles. The input layer, shown in FIG. 6 can consist of spatial convolutions and can generate eight activation maps, $A^1, A^2, \ldots A^8$ as shown in FIG. 7. The generated activation maps can include shared weights applied to each of the eight frames. If the plume exhibits linear temperature profiles as shown in FIG. 7, the plume can be separated from other phenomenon by calculating the slope using equation (1) below:

$$m = \frac{T_2 - T_1}{t_2 - t_1} = w_2 T_2 + w_1 T_1 \qquad (1)$$

Using a gradient descent optimizer, weights $w_2$, $w_2$ which can be trained to represent $w_1 A^1 + w_2 A^2 + \ldots + w_8 A^8$ as the plume heat transfer pattern. A single 3D convolutional layer as shown in FIG. 7 would be able to represent this sum and learn the necessary slopes in temporal dimension.

Figure 8:
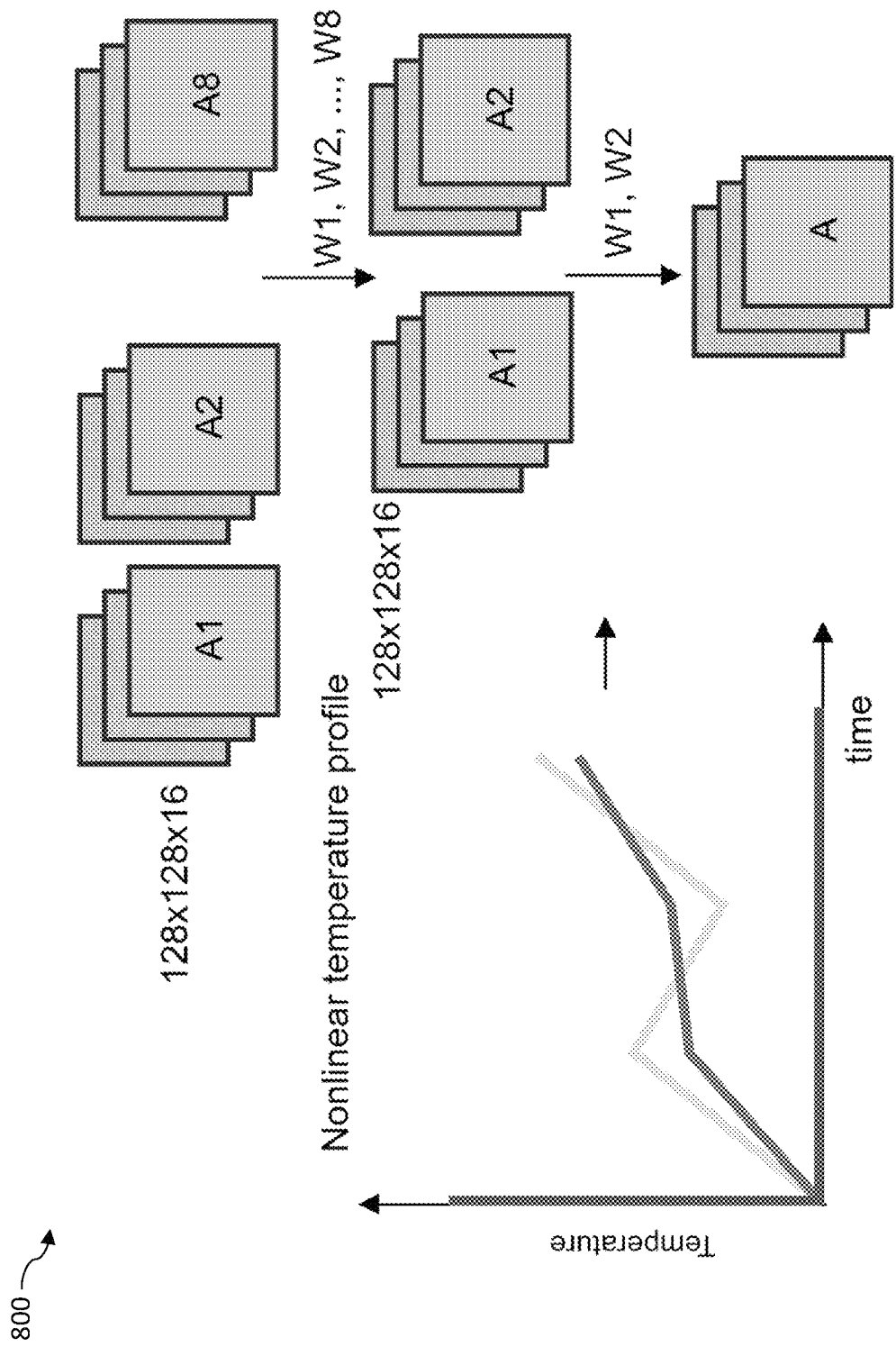
FIG. 8 is a diagram illustrating 2-stage 3D convolution used in processing complex non-linear variations in temperature profiles of plume blobs over time according to an exemplary embodiment described herein.

FIG. 8 is a diagram 800 illustrating 2-stage 3D convolution used in processing complex non-linear variations in temperature profiles of plume blobs over time. To mitigate this, a hidden layer is added and nonlinearity is introduced using nonlinear activation functions like sigmoid, ReLu, or the like. As shown in FIG. 8, neither target plume patterns, not other background phenomenon do not necessarily follow linear temperature profiles over time. A 2-stage 3D convolution is applied to capture nonlinear patterns in the temporal dimension.

Figure 9:
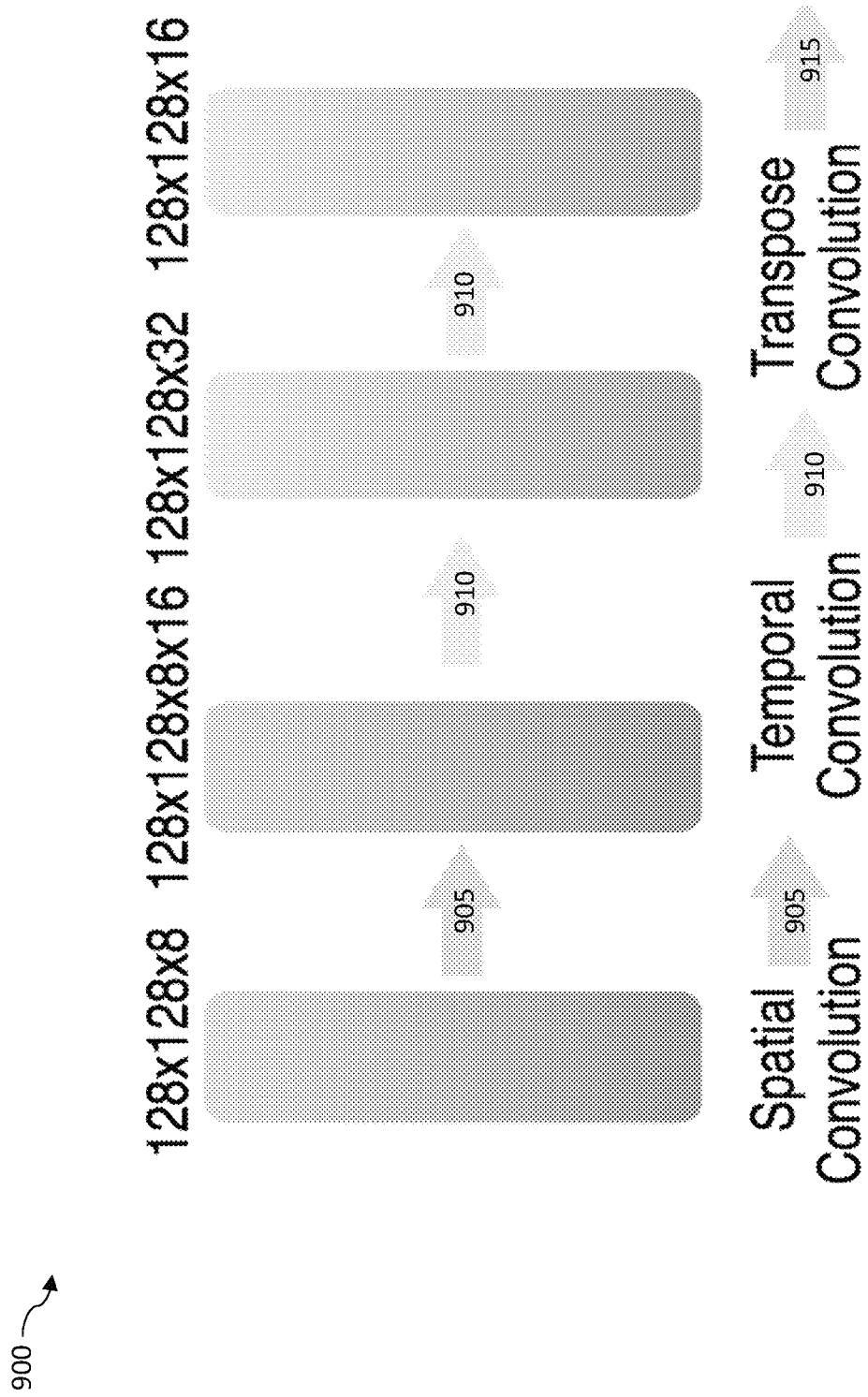
FIG. 9 is a diagram illustrating a 3D convolutional block used within the spatio-temporal encoder-decoder network according to an exemplary embodiment described herein.

FIG. 9 is a diagram 900 illustrating a 3D convolutional block used within the spatio-temporal encoder-decoder network described herein. 3D convolutions can be applied in two stages to extract 16 temporal feature maps with a final tensor size of 128×128×1×16. The first stage, spatial convolution operation 905, can include 16 filters with a kernel size of 3×1×1 and a stride of 2×1×1. A second 3D convolutional layer, temporal convolution operation 910, can consist of 16 filters each with a kernel size of 3×1×1 and a stride of 2×1×1.

Figure 10:
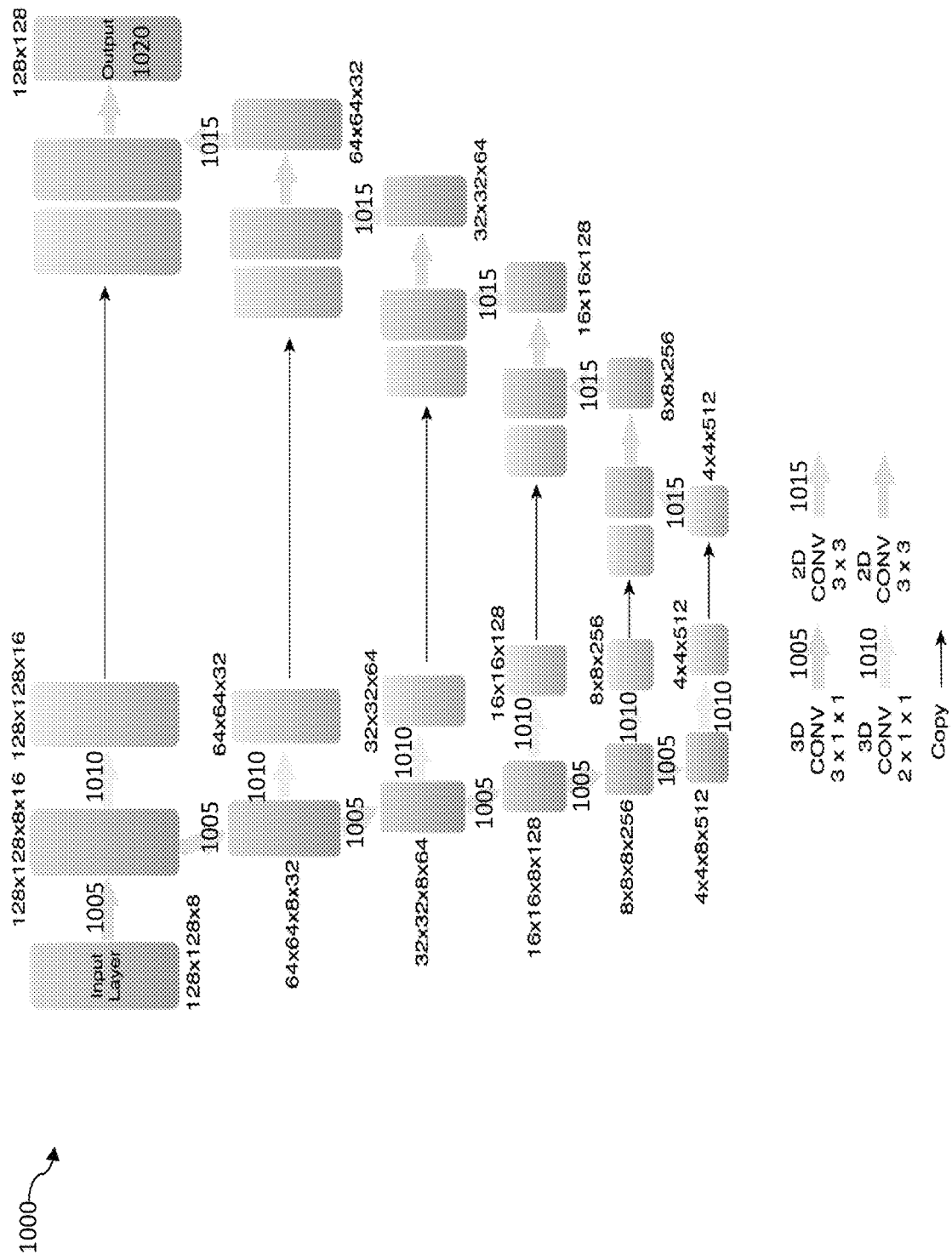
FIG. 10 is a diagram illustrating a full network architecture of the spatio-temporal encoder-decoder network according to an exemplary embodiment described herein.

FIG. 10 is a diagram 1000 illustrating a full network architecture of the spatio-temporal encoder-decoder network described herein. As shown in FIG. 10, the left side of the diagram is the encoder network and the right side of the diagram is the decoder network. The arrows denote spatial, temporal, and transpose convolution operations. All of the 2D convolutional layers have kernel size 3×3 and stride 2×2 to halve the resolution and the number of filters is doubled after each stage. Spatial convolution operations are shown by references 1005, temporal convolution operations are shown by references 1010, and transpose convolution operations are shown by references 1015.

As shown in FIG. 10, the output 1020 can be a binary mask per 8-frame sequence separating plume pattern from all other phenomena. The ground-truth mask of the last frame in an 8-frame sequence can be used to train the network. During training, the energy function of U-Net is used and a pixel-wise soft-max for the final feature map can be combined with the cross-entropy loss function. Since this can be a relatively shallow network, no weight initialization schemes with other tasks such as compression-decompression may be required or used but rather all weights are initialized randomly.

Requiring one ground-truth mask per 8-frame sequence can be advantageous as it reduces the amount of annotation required to create training datasets. However, an alternative network, ST-U-net-Full can also be implemented with a slight variation to the decoder network architecture where the network outputs one mask for each frame in a given 8-frame input sequence. With this variation, all 8 ground-truth masks can be used by the loss function to train the network. Although this change can increase the network size considerably, experimental results show that pixel-wise precision improves.

Figure 11:
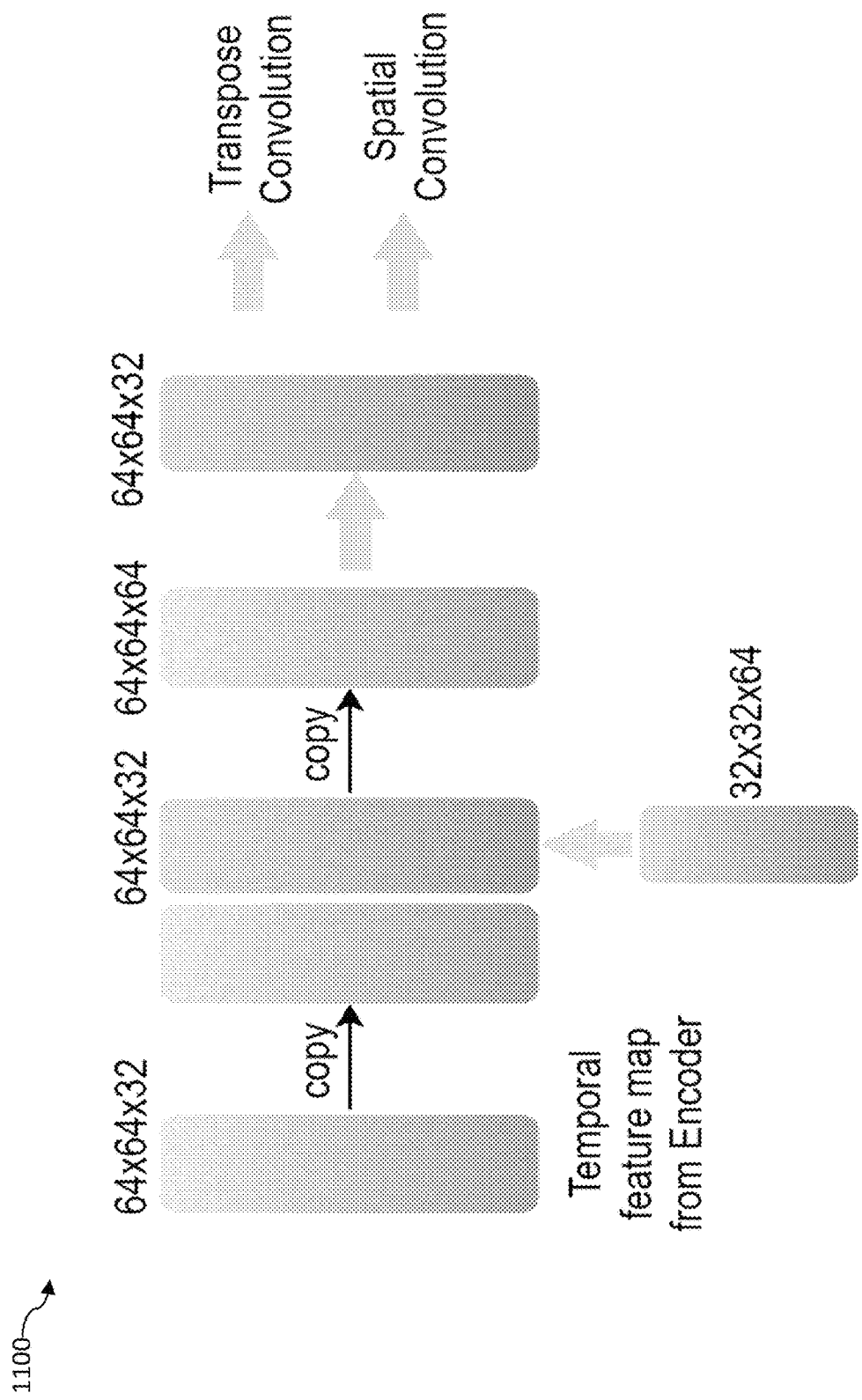
FIG. 11 is a diagram illustrating decoding stage operations of the spatio-temporal encoder-decoder network according to an exemplary embodiment described herein.

FIG. 11 is a diagram 1100 illustrating decoding stage operations of the spatio-temporal encoder-decoder network described herein. Decoding stage operations on a given layer where the feature map size from previous layer is doubled via transpose convolutions and the temporal feature map of encoding layer are concatenated to the feature map of the current layer. As shown in FIG. 11, feature maps from 6 stages can vary in the degree of texture and context they capture. Starting from the 4×4×512 feature map of stage-6 in FIG. 10 which captures the highest context (largest receptive field), the resolution of the segmentation map can be increased incrementally by incorporating higher context from $i^{th}$ stage with texture from $(i-1)^{th}$ stage via the operations shown in FIG. 11. During the decoding stage, the 2D transpose convolutional layer has a kernel size of 3×3 and stride 2×2 to double the resolution and the 2D convolutional layer has a kernel size of 1×1 and stride 1×1.

Figure 12:
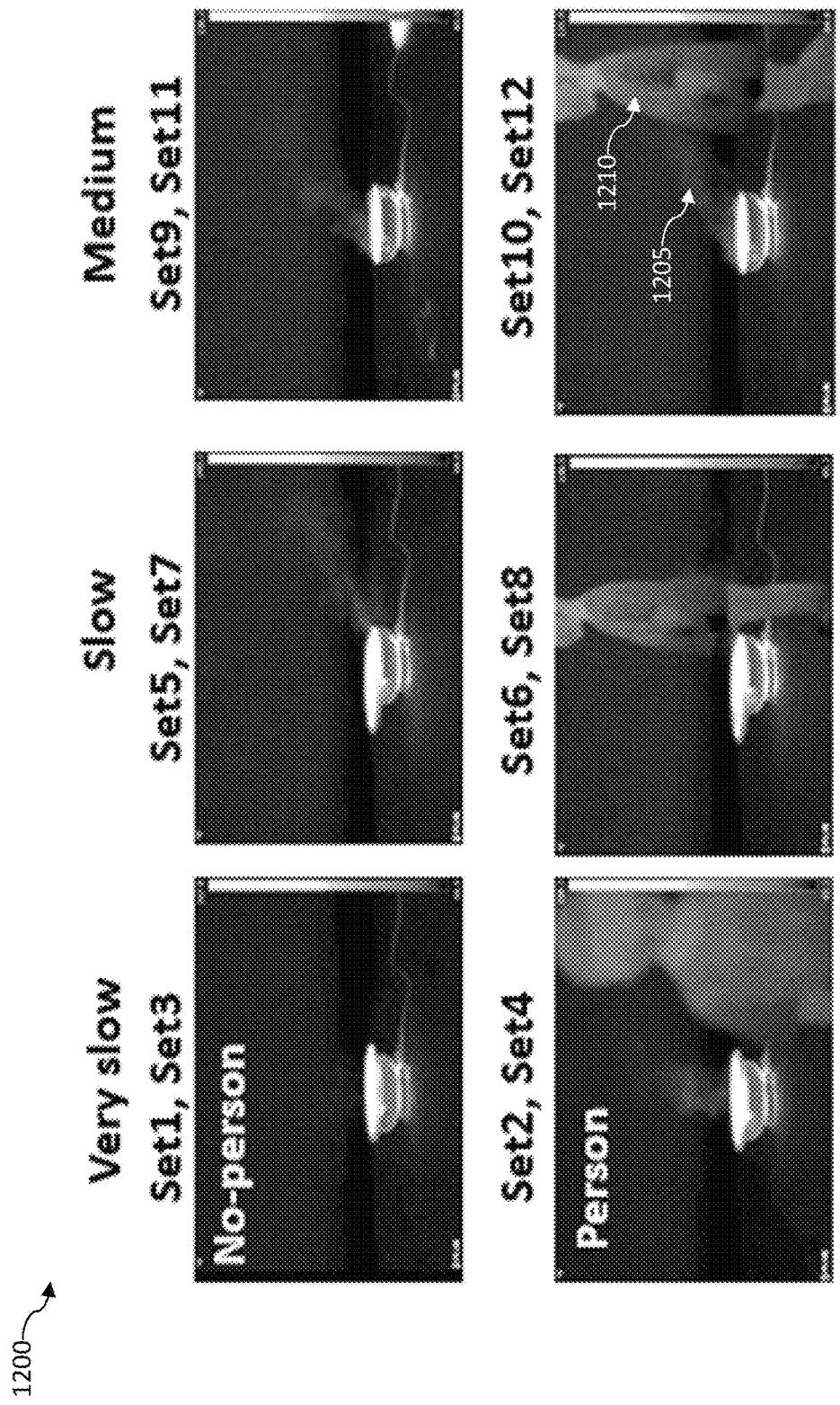
FIG. 12 is a diagram illustrating an IR stream video dataset collected for the experimental results according to an exemplary embodiment described herein.

FIG. 12 is a diagram 1200 illustrating an IR stream video dataset collected for the experimental results. A total of 12 datasets were collected. A humidifier, operating at varying speeds, was used to generate a plume of steam 1205. A person 1210 walking in front of the humidifier was used for occlusion purposes. A controlled environment can be configured to collect a series of IR videos using a FLIR T640 camera with a 41 mm lens. The humidifier with adjustable speeds can be used to generate varying rates and density of steam plumes. To introduce varying foreground conditions, a person can walk in front of the steamer in some of the videos. A total of 12 videos can be generated with 3 humidifier settings: very slow, slow and medium where 4 videos per setting are collected. For each setting, two of the videos contained a human walking in front of the camera occluding the humidifier and the plume. FIG. 12 shows the names of videos as Set 1, 2, 3, . . . 12 and the combinations of the environmental conditions. 20 to 30 second video clips were collected at 30 fps rate. The videos were scaled and contrast enhanced using FLIR SDK with emissivity 0.95 and reflective temperature 77° F. settings. To support training and performance analysis, a total of 900 frames were manually annotated with the outline of the steam in Sets 1, 3, 4, 5, 6, 7, 9, 10 and 11. A total of 450 frames were manually annotated with the outline of the steam plume in Sets 2, 8 and 12 as a separate test set.

Figure 13:
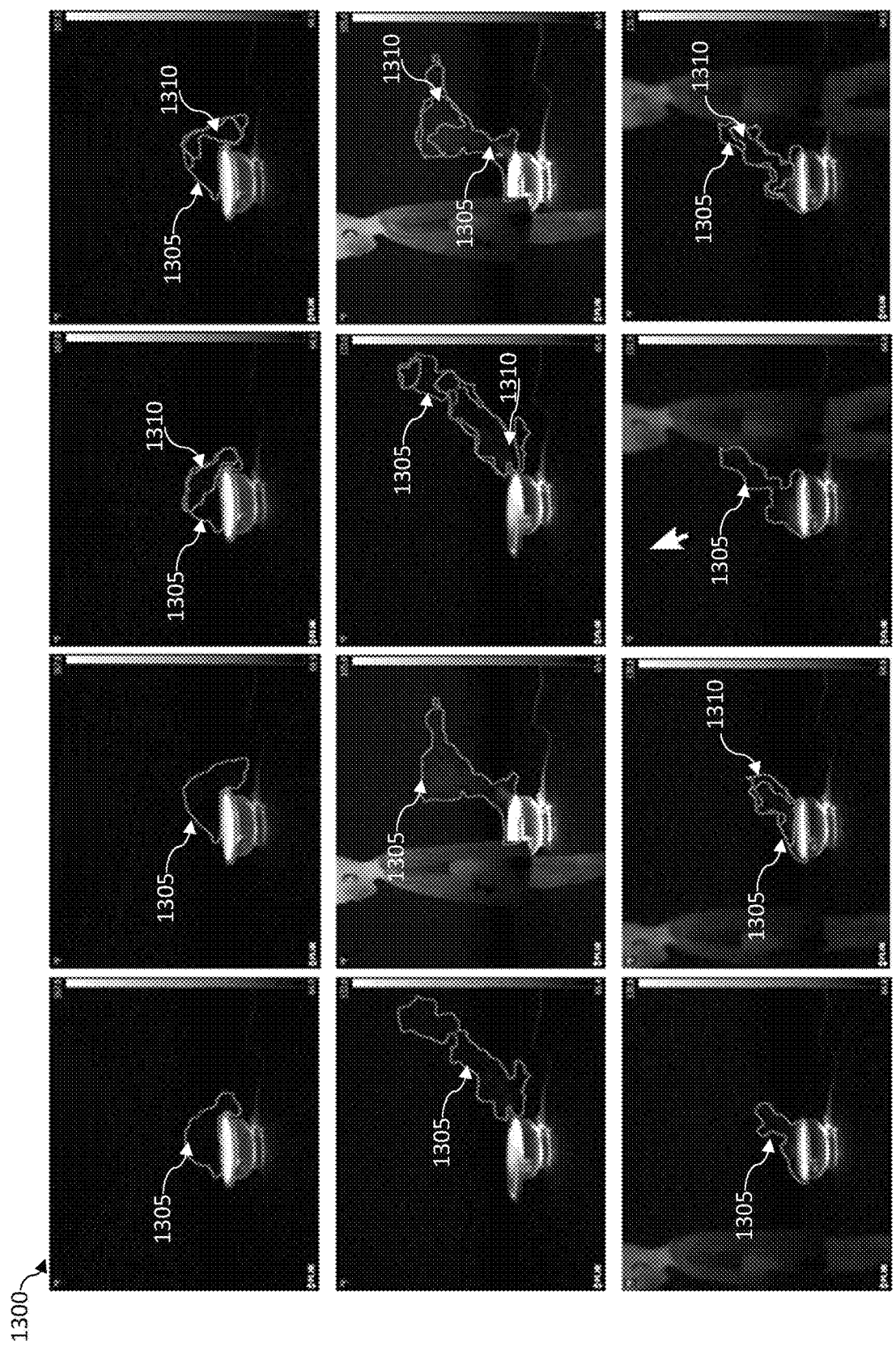
FIG. 13 is a diagram illustrating plume prediction results for selected frames using the ST-U-Net-Full network according to an exemplary embodiment described herein.

FIG. 13 is a diagram 1300 illustrating plume prediction results for selected frames using the ST-U-net-Full network described herein. References 1305 illustrate outlines of the ground-truth plume annotations and references 1310 illustrate outlines of the predicted plume formations generated by the network described herein.

The effectiveness of the proposed spatio-temporal U-Net on the IR steam video database was verified as follows. The spatio-temporal U-Net, spatio-temporal U-Net-Full, and an LSTM-based network were trained on the annotated training frames by generating random exemplars of 8-frame sequences. Standard precision and recall measures at pixel level were calculated on 8-frame test sequences by comparing ground-truth manual annotations to network predictions. For fairness, only the last frame's ground-truth mask was compared to last frame's prediction for all three networks even though spatio-temporal U-Net-Full network generates a mask for all eight frames in the sequence. FIG. 12 illustrates the prediction results as overlaid on ground-truth plume annotations for the spatio-temporal U-Net-Full network. Table 1 below summarizes pixel-wise mask prediction performance of all three networks on test sequences from three sets of IR videos.

TABLE 1

| Method | Set12 | | Set8 | | Set2 | |
| --- | --- | --- | --- | --- | --- | --- |
| | Precision | Recall | Precision | Recall | Precision | Recall |
| LSTM | 0.70 | 0.62 | 0.73 | 0.76 | 0.60 | 0.57 |
| ST-U-NET | 0.63 | 0.68 | 0.72 | 0.85 | 0.67 | 0.86 |
| ST-U-NET-Full | 0.82 | 0.62 | 0.84 | 0.77 | 0.83 | 0.71 |

Spatio-temporal U-Net variations clearly outperform LSTM-based network especially in terms of precision. Even if a full plume is not segmented out (around 70% recall), spatio-temporal U-Net (ST-U-NET) does a better job at overlapping with the ground-truth polygons (better than 80% precision). LSTM seems to be more vulnerable to some random perturbations in the background heat patterns generating false alarms at irrelevant parts of the frames. The results are especially impressive for Set2 where the plume is barely visible to human eye. Thus, the spatio-temporal U-Net variations described herein isolate low-level plume patterns from high-level ones successfully and outperform LSTM-based segmentation network.

FIG. 14 is a diagram 1400 of a plume prediction segmentation mask 1405 which delineates the extent of the plume in one frame 1410 of the sequence of image frames included in the image data. The velocity of particles in the imaged plume can be determined as the speed and direction of particles that go through one of the cross-sections of the plume prediction segmentation mask. The velocity of particles in the imaged plume can be determined via computer vision techniques, such as optical flow which produce dense velocity fields as output from two or more subsequent frames. These dense velocity fields record speed in units of pixels per second and direction of flow at each pixel. The frame rate of the frame sequence can be known from the camera specifications, e.g., 15 Hz or 30 Hz. Given such velocity estimation, a cross-section of the plume can be identified and a diameter of the plume can be measured in units of pixels. Assuming gas disperses in a circular fashion in 3D around this 2D cross-section of the plume, the area of the cross-section can be estimated from the diameter of the cross-section in units pixel square. Based on the cross-section area and velocity estimations, a volumetric leak rate can be calculated in units of pixel cube per second as the volume of gas that is escaping in one second through that cross-section in the plume. Using the velocity estimation and the plume prediction segmentation mask, a source pixel 1415 can also be estimated. Source estimation can be beneficial for identifying components which may be leaking. The volumetric leak rate estimation in units pixel cube per second can be calibrated to units cubic feet per second by means of calibration of image pixels to a physical size in units of feet.

The improved plume prediction system described herein addresses the technical problem of efficiently generating plume analysis data for a plume of gas based on image data. The problem of determining and generating accurate, detailed, ground-truth and predicted segmentation masks for a plume of gas can be difficult and time-consuming, requiring significant human and computing resources to generate and store multiple databases containing large libraries of ground-truth plume data which must be catalogued and indexed appropriately. The exemplary technical effects of the methods, systems, and devices described herein include, by way of non-limiting example, generating observed and predicted spatial and temporal characteristics of gas plumes based on image data using a predictive model trained in a deep learning process. The predictive model reduces the need for significant computing resources storing large databases of image data and the need for skilled personnel to manually determine characteristics of the gaseous plume which may be associated with a leak from an industrial asset. The predictive model also provides the exemplary technical effect of reducing calculation times, improving the generation of metrics associated with the plume of gas, such as leak detection and leak size determination, and improved visualization of the generated plume analysis data as overlays atop the image data. Thus the system represents an improvement of computer functionality that processes image data and generates plume analysis data corresponding to one or more target plumes of gas which may or may not be leaking from an industrial asset or other source, such as a terrestrial or aquatic geologic formation. Additionally, the clients 105 can include an improved display or graphical user interface (GUI) that provides more efficient visualization and execution of plume analysis data such as when visualizing the ground-truth and plume prediction segmentation masks as overlays atop individual image frames, particular sequences of image frames or streaming videos of the image frames. The improved GUI can also provide enhanced visualizations for responding to alerts or notifications for anomalous plume conditions, planning maintenance of repair procedures for industrial assets for which a plume of gas may manifest as a leak, or managing production rates of the production environment within desirable ranges. Existing plume inspection and monitoring applications or systems typically do not include such robust interfaces to provide the plume analysis data generated by a trained prediction model. Existing applications are limited to interfaces which may provide current or historical image data for a plume of gas, but lack plume analysis data generated based on image data in received and displayed in real time or near real-time. The improved plume prediction system provides a predictive, automated, user-configurable plume detection and leak size prediction system capable of generating spatio-temporal plume analysis data based on inputs that include minimal indications of such characteristics in the image data used as inputs.

Certain exemplary embodiments have been described to provide an overall understanding of the principles of the structure, function, manufacture, and use of the systems, devices, and methods disclosed herein. One or more examples of these embodiments have been illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The subject matter described herein can be implemented in analog electronic circuitry, digital electronic circuitry, and/or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., a GPU (graphical processing unit), an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

The invention claimed is:

1. A method comprising:
   receiving image data associated with a plume of gas, the image data including a plurality of image frames;
   determining plume analysis data using the received image data and a first predictive model trained to receive image data and, in response to the receiving, generate plume analysis data associated with the plume of gas, the plume analysis data including a plume prediction segmentation mask associated with the plume of gas and predicted in relation to a sequence of image frames included in the image data, wherein the plume prediction segmentation mask includes a pixel-wise segmentation delineating a boundary of the plume of gas predicted via the first predictive model that is overlaid atop a pixel-wise depiction of a ground-truth segmentation mask including annotation data associated with the sequence of image frames and provided by a user training the first predictive model;

determining, for the plume of gas, at least one of a leak size estimation, a leak source estimation, and a volumetric leak rate estimation;

providing the leak size estimation, the leak source estimation, the volumetric leak rate estimation, and the plume analysis data, wherein the plume analysis data is provided as an overlay atop the image data; and transmitting the plume analysis data overlaid atop the image data, wherein at least one of the receiving, the determining, the providing, and the transmitting is performed by at least one data processor forming part of at least one computing system.

2. The method of claim 1, wherein the plume of gas includes a plume of smoke, a plume of steam, a plume of gas, or plume of a gas mixture.

3. The method of claim 1, wherein the image data is acquired by a camera configured to capture each image frame using infrared light or visible light.

4. The method of claim 3, wherein the leak size estimation includes a pixel-wise classification of pre-determined leak sizes delineating a boundary of the plume of gas as predicted based on the sequence of image frames.

5. The method of claim 3, wherein the camera is configured to acquire each image frame from a fixed location or from a mobile platform.

6. The method of claim 5, wherein the mobile platform includes a manned ground vehicle, an unmanned ground vehicle, a manned aerial vehicle, an unmanned aerial vehicle, a manned surface vehicle, an unmanned surface vehicle, a manned underwater vehicle, an unmanned underwater vehicle, a robot, or a mobile platform attached to a human in motion.

7. The method of claim 1, wherein determining the leak source estimation further comprises
determining one or more pixels of the plume in one or more frames of the sequence of image frames based on a velocity estimation of a flow of particles within a region of the plume.

8. The method of claim 7, wherein determining the volumetric leak rate further comprises
determining a cross-sectional area of the plume prediction segmentation mask; and
determining the velocity estimation of the flow of particles as they cross the cross-sectional area of the plume prediction segmentation mask.

9. The method of claim 1, further comprising,
determining plume analysis data using the received image data and a second predictive model trained to receive image data; and
generate, in response to the receiving, the plume analysis data associated with the plume of gas using the second predictive model, wherein the plume analysis data includes a plume prediction segmentation mask associated with the plume of gas and predicted in relation to each image frame in the sequence of image frames included in the image data.

10. A system comprising:
a first computing device, including a data processor and a memory storing computer-readable instructions and a plurality of prediction models, the processor configured to execute the computer-readable instructions, which when executed, cause the processor to perform operations including
receiving image data associated with a plume of gas, the image data including a plurality of image frames,
determining plume analysis data using the received image data and a first predictive model trained to receive image data and, in response to the receiving, generate plume analysis data associated with the plume of gas, the plume analysis data including a plume prediction segmentation mask associated with the plume of gas and predicted in relation to a sequence of image frames included in the image data, wherein the plume prediction segmentation mask includes a pixel-wise segmentation delineating a boundary of the plume of gas predicted via the first predictive model that is overlaid atop a pixel-wise depiction of a ground-truth segmentation mask including annotation data associated with the sequence of image frames and provided by a user training the first predictive model;
determining, for the plume of gas, at least one of a leak size estimation, a leak source estimation, and a volumetric leak rate estimation;
providing the leak size estimation, the leak source estimation, the volumetric leak rate estimation as calculated attributes, and the plume analysis data, wherein the plume analysis data is provided as an overlay atop the image data, and
transmitting the plume analysis data overlaid atop the image data; and
a second computing device coupled to the first computing device via a network, the second computing device including a display configured to present the transmitted plume analysis data via the display.

11. The system of claim 10, wherein the plume of gas includes a plume of smoke, a plume of steam, a plume of gas, or a plume of a gas mixture.

12. The system of claim 10, further comprising a camera configured to capture each image frame using infrared light or visible light.

13. The system of claim 12, wherein a leak size estimation includes a pixel-wise classification of pre-determined leak sizes delineating a boundary of the plume of gas as predicted based on the sequence of image frames.

14. The system of claim 12, wherein the camera is configured to acquire each image frame from a fixed location or from a mobile platform.

15. The system of claim 14, wherein the mobile platform includes a manned ground vehicle, an unmanned ground vehicle, a manned aerial vehicle, an unmanned aerial vehicle, a manned surface vehicle, an unmanned surface vehicle, a manned underwater vehicle, an unmanned underwater vehicle, a robot, or a mobile platform attached to a human in motion.

16. The system of claim 10, wherein the computer-readable instructions further cause the processor to determine the leak source estimation by
determining one or more pixels of the plume in one or more frames of the sequence of image frames based on a velocity estimation of a flow of particles within a region of the plume.

17. The system of claim 16, wherein the computer-readable instructions further cause the processor to determine the volumetric leak rate by
- determining a cross-sectional area of the plume prediction segmentation mask; and
- determining the velocity estimation of the flow of particles as they cross the cross-sectional area of the plume prediction segmentation mask.

18. The system of claim 10, wherein the computer-readable instructions further cause the processor to
- determine plume analysis data using the received image data and a second predictive model trained to receive image data; and
- generate, in response to the receiving, the plume analysis data associated with the plume of gas using the second predictive model, wherein the plume analysis data includes a plume prediction segmentation mask associated with the plume of gas and predicted in relation to each image frame in the sequence of image frames included in the image data.

* * * * *